United States Patent
Guan et al.

(10) Patent No.: US 7,609,851 B2
(45) Date of Patent: Oct. 27, 2009

(54) EMBEDDING DATA INTO DOCUMENT AND EXTRACTING EMBEDDED DATA FROM DOCUMENT

(75) Inventors: Haike Guan, Kanagawa-ken (JP); Masaaki Ishikawa, Tokyo-to (JP); Hiroshi Shimura, Kanagawa-ken (JP); Takashi Saitoh, Tokyo-to (JP); Hiroyuki Yoshida, Tokyo-to (JP)

(73) Assignee: Ricoh Company, Ltd., Tokyo (JP)

( * ) Notice: Subject to any disclaimer, the term of this patent is extended or adjusted under 35 U.S.C. 154(b) by 693 days.

(21) Appl. No.: 11/369,964

(22) Filed: Mar. 8, 2006

(65) Prior Publication Data
US 2006/0256362 A1    Nov. 16, 2006

(30) Foreign Application Priority Data
Mar. 10, 2005 (JP) .............................. 2005-067760
Nov. 29, 2005 (JP) .............................. 2005-343852

(51) Int. Cl.
*G06K 9/00* (2006.01)
(52) U.S. Cl. ...................................... 382/100
(58) Field of Classification Search ................... 382/100
See application file for complete search history.

(56) References Cited

U.S. PATENT DOCUMENTS

| 5,798,844 | A | 8/1998 | Sakano et al. |
| 5,946,414 | A | 8/1999 | Cass et al. |
| 6,824,240 | B2 * | 11/2004 | Kusakabe et al. ............. 347/15 |
| 2003/0021442 | A1 | 1/2003 | Suzaki |
| 2003/0133163 | A1 | 7/2003 | Wang et al. |

FOREIGN PATENT DOCUMENTS

| DE | 102 17 156 A1 | 11/2003 |
| EP | 1 385 327 A2 | 1/2004 |
| JP | 2001-086330 | 3/2001 |
| JP | 2001-197297 | 7/2001 |
| JP | 2005-102124 | 4/2005 |

* cited by examiner

*Primary Examiner*—Tom Y Lu
(74) *Attorney, Agent, or Firm*—Dickstein Shapiro LLP

(57) ABSTRACT

An apparatus, method, system, computer program and product, each capable of embedding data into a document or extracting embedded data from document. The data to be embedded may be embedded in the form of a plurality of patterns having a relative relationship.

17 Claims, 33 Drawing Sheets

FIG. 7A
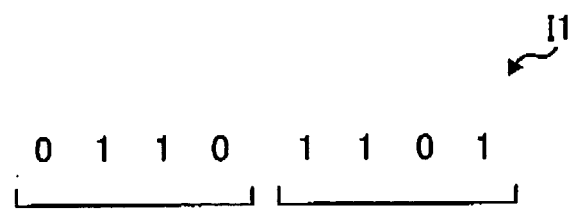
FIG. 7B
FIG. 7C
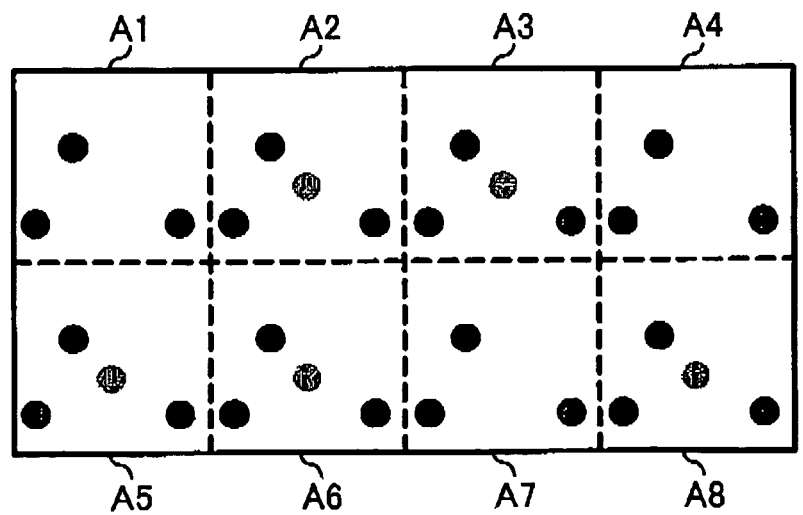

FIG. 8A
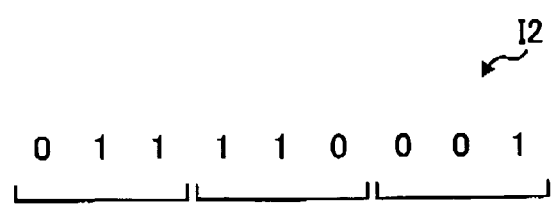
FIG. 8B
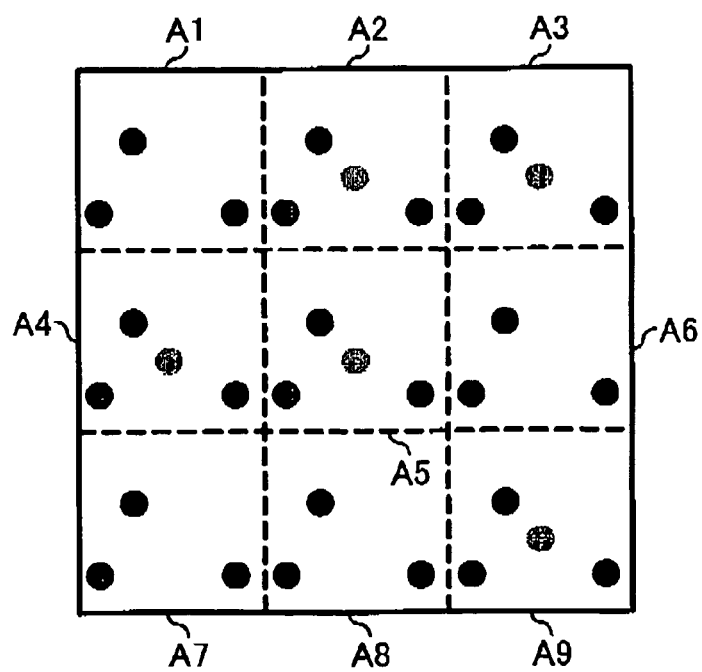
FIG. 8C

FIG. 9A
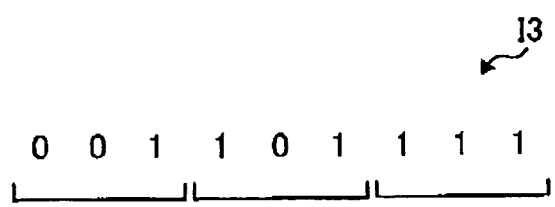
FIG. 9B
FIG. 9C
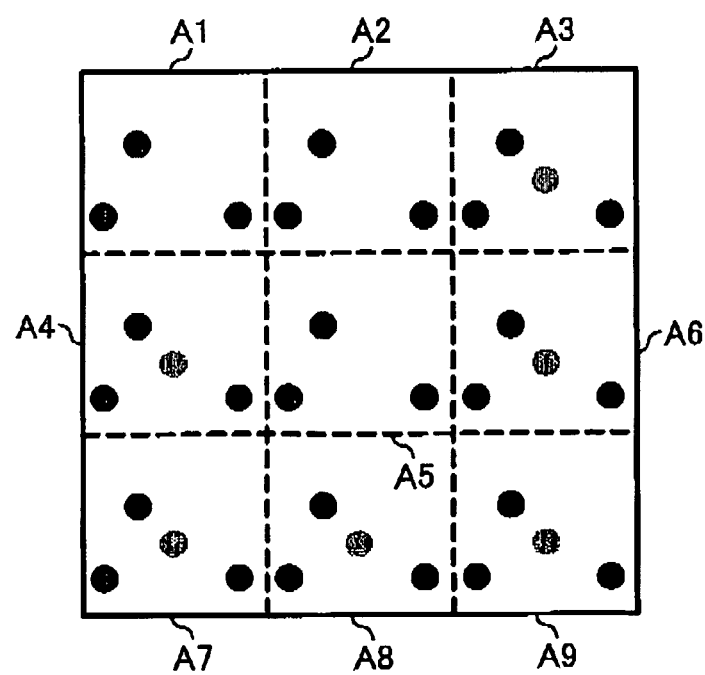

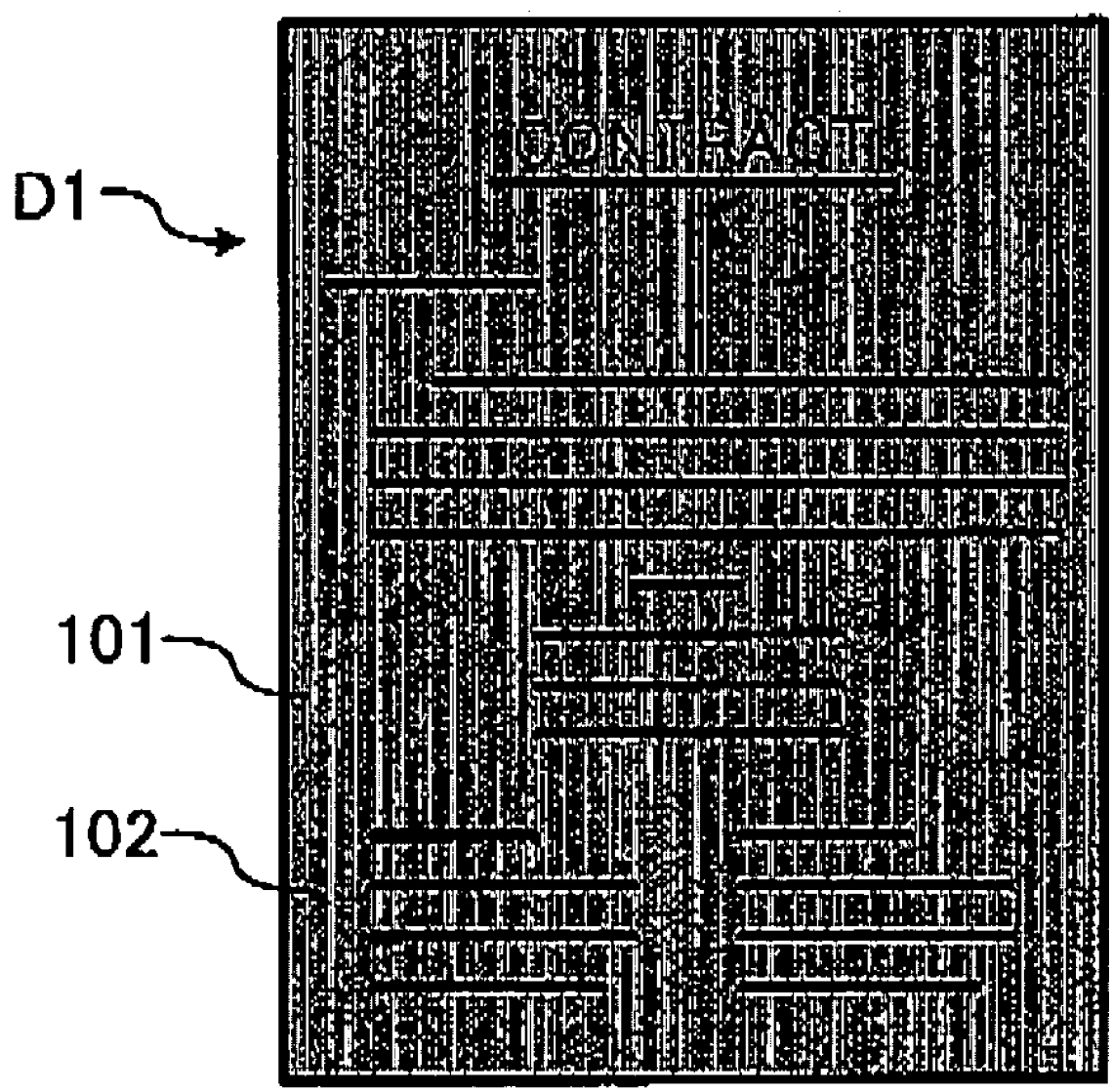

FIG. 18A
FIG. 18B
FIG. 18C
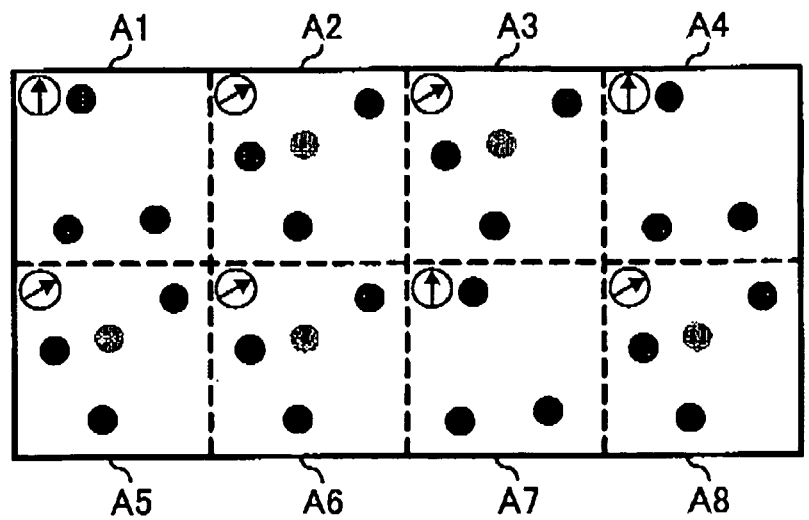

FIG. 19A
FIG. 19B
FIG. 19C
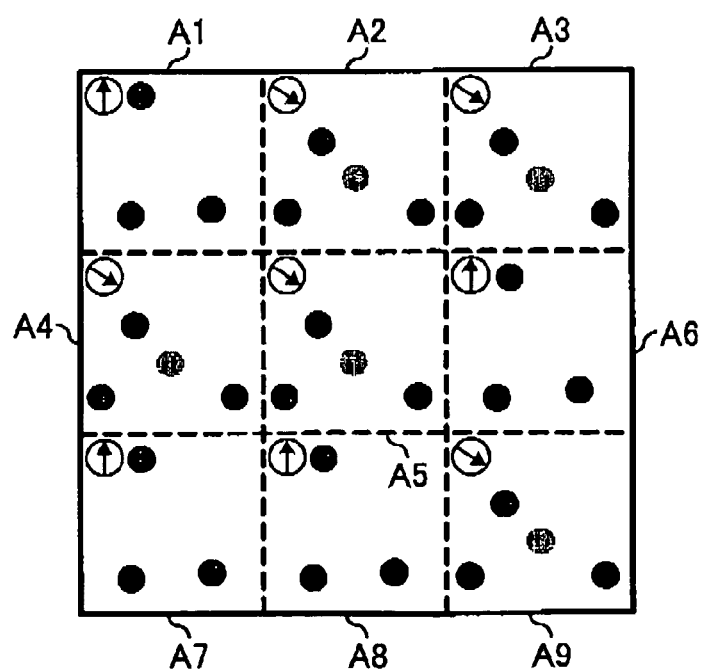

FIG. 20A
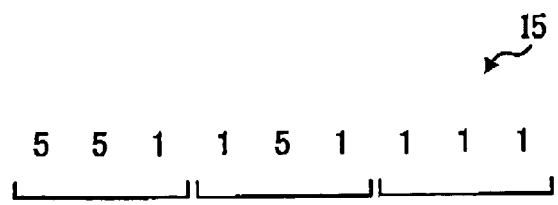
FIG. 20B
FIG. 20C
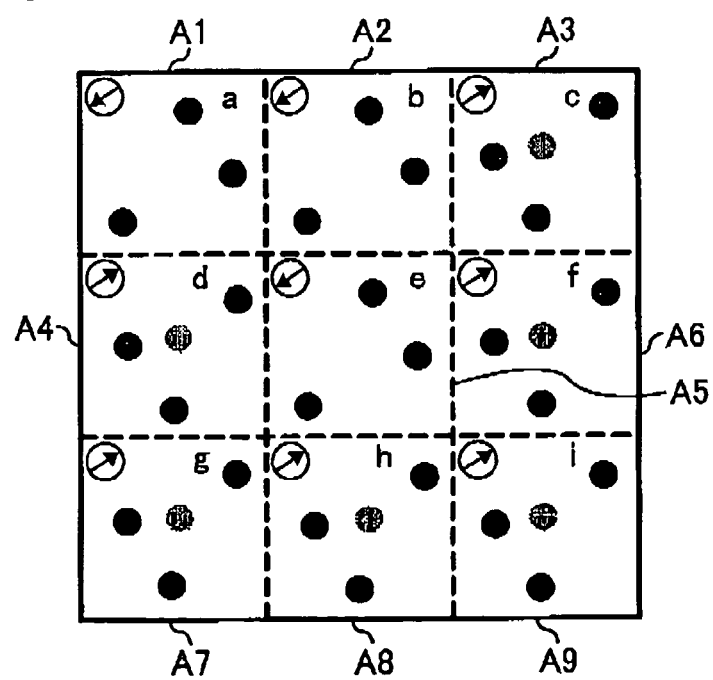

EMBEDDING DATA INTO DOCUMENT AND EXTRACTING EMBEDDED DATA FROM DOCUMENT

CROSS REFERENCE TO RELATED APPLICATIONS

This patent application is related to and claims priority under 35 U.S.C. §119 to Japanese Patent Application Nos. 2005-067760 filed on Mar. 10, 2005, and 2005-343852, filed on Nov. 29, 2005, in the Japanese Patent Office, the entire contents of which are hereby incorporated by reference.

FIELD OF THE INVENTION

The following disclosure relates generally to an apparatus, method, system, computer program and product, each capable of embedding data into a document or extracting embedded data from a document.

DESCRIPTION OF THE RELATED ART

Recent image processing apparatuses have a function of prohibiting output of a copy guarded document. The copy guarded document corresponds to any kind of document prohibited from being reproduced, such as a monetary document or a confidential document. Once an input document is recognized as the copy guarded document, for example, based on a pattern or mark detected in the input document, output of the input document may be prohibited. Alternatively, information contained in the input document may be changed or concealed when the input document is output, when the input document is recognized as the copy guarded document.

However, the amount of data that can be contained in the pattern or mark of the copy guarded document is usually limited. In the example case described in the U.S. Patent Application Publication No. 2005078331, published on Apr. 14, 2005, the amount of data that can be contained in one pattern is limited to one-bit.

BRIEF SUMMARY OF THE INVENTION

In light of the above-described and other problems, example embodiments of the present invention provide an apparatus, method, system, computer program and product, each capable of embedding data into a document or extracting embedded data from a document. The data to be embedded, i.e., the embedded data, may contain more than one bit of information.

In one example, a processed image, which functions as a copy guarded image, may be generated from an original image by embedding embedded data into the original image. The embedded data is embedded into an embedded area of the original image in the form of a plurality of patterns. The plurality of patterns has a relative relationship, which is determined based on the embedded data.

In another example, embedded data may be extracted from an original image, if the original image is recognized as a processed image, i.e., a copy guarded image. A plurality of patterns having a relative relationship may be detected in the original image. The embedded data may be obtained by analyzing the relative relationship of the plurality of patterns.

BRIEF DESCRIPTION OF THE DRAWINGS

A more complete appreciation of the disclosure and many of the attendant advantages thereof will be readily obtained as the same becomes better understood by reference to the following detailed description of example embodiments when considered in connection with the accompanying drawings, in which:

FIG. 7A is an illustration of first embedded data to be embedded into an embedded area of the original image of FIG. 4 according to an example embodiment of the present invention;

FIG. 7B is an illustration of an example arrangement determined by the embedding apparatus of FIG. 1;

FIG. 7C is an illustration of a plurality of patterns embedded into the embedded area of the original image of FIG. 4, based on the first embedded data of FIG. 7A;

FIG. 8A is an illustration of second embedded data to be embedded into an embedded area of the original image of FIG. 4 according to an example embodiment of the present invention;

FIG. 8B is an illustration of an example arrangement determined by the embedding apparatus of FIG. 1;

FIG. 8C is an illustration of a plurality of patterns embedded into the embedded area of the original image of FIG. 4, based on the second embedded data of FIG. 8A;

FIG. 9A is an illustration of third embedded data to be embedded into an embedded area of the original image of FIG. 4 according to an example embodiment of the present invention;

FIG. 9B is an illustration of an example arrangement determined by the embedding apparatus of FIG. 1;

FIG. 9C is an illustration of a plurality of patterns embedded into the embedded area of the original image of FIG. 4, based on the third embedded data of FIG. 9A;

FIG. 10 is an illustration of an example processed image generated from the example original image of FIG. 4;

FIG. 18A is an illustration of the first embedded data to be embedded into an embedded area of the original image of FIG. 4 according to an example embodiment of the present invention;

FIG. 18B is an illustration of an example arrangement determined by the embedding apparatus of FIG. 1;

FIG. 18C is an illustration of a plurality of patterns embedded into the embedded area of the original image of FIG. 4, based on the first embedded data of FIG. 18A;

FIG. 19A is an illustration of fourth embedded data to be embedded into an embedded area of the original image of FIG. 4 according to an example embodiment of the present invention;

FIG. 19B is an illustration of an example arrangement determined by the embedding apparatus of FIG. 1;

FIG. 19C is an illustration of a plurality of patterns embedded into the embedded area of the original image of FIG. 4, based on the fourth embedded data of FIG. 19A;

FIG. 20A is an illustration of fifth embedded data to be embedded into an embedded area of the original image of FIG. 4 according to an example embodiment of the present invention;

FIG. 20B is an illustration of an example arrangement determined by the embedding apparatus of FIG. 1;

FIG. 20C is an illustration of a plurality of patterns embedded into the embedded area of the original image of FIG. 4, based on the fifth embedded data of FIG. 20A;

DETAILED DESCRIPTION OF THE INVENTION

Figure 1:
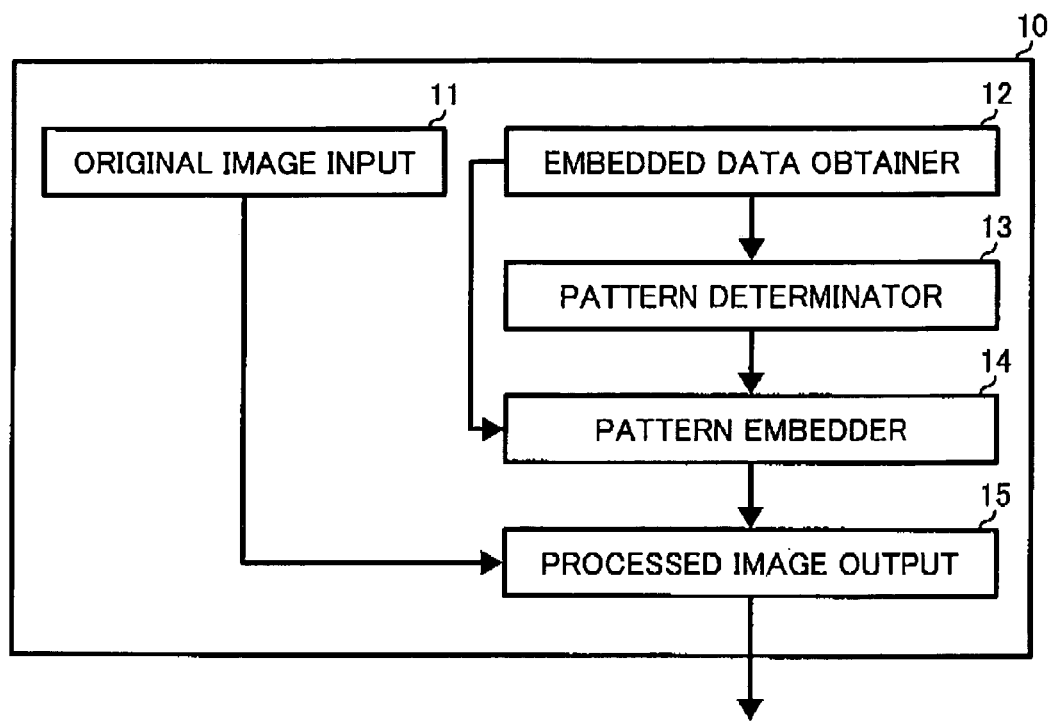
FIG. 1 is a schematic block diagram illustrating the functional structure of an embedding apparatus according to an example embodiment of the present invention.

In describing the example embodiments illustrated in the drawings, specific terminology is employed for clarity. However, the disclosure of this patent specification is not intended to be limited to the specific terminology selected and it is to be understood that each specific element includes all technical equivalents that operate in a similar manner. Referring now to the drawings, wherein like reference numerals designate identical or corresponding parts throughout the several views, FIG. 1 illustrates an embedding apparatus 10 according to an example embodiment of the present invention. The embedding apparatus 10 is capable of embedding data into an original image. As shown in FIG. 1, the embedding apparatus 10 includes an original image input 11, an embedded data obtainer 12, a pattern determinator 13, a pattern embedder 14, and a processed image output 15.

The original image input 11 inputs an original image to be processed. In one example, the original image input 11 may obtain the original image from the outside, such as a storage device or medium connected to the embedding apparatus 10. In another example, the original image input 11 may receive an original document, and convert it into the original image using a scanner. In another example, the original image input 11 may read out the original image from a memory of the embedding apparatus 10.

The embedded data obtainer 12 obtains embedded data, which is to be embedded into an embedded area of the original image. In this example, the embedded data may be previously determined by default. Alternatively, the embedded data may be determined according to the user's preference. The embedded data contains information, which can be expressed by a predetermined number of digits, for example, as described below referring to any one of FIGS. 7A, 8A, 9A, 18A, 19A, and 20A. Further, in this example, the embedded data is to be embedded in the form of a plurality of patterns.

The pattern determinator 13 determines one or more types to be used for the plurality of patterns, based on the information contained in the embedded data. For example, if the embedded data contains information that can be expressed by either one of the binary characters 0 and 1, the pattern determinator 13 may select a first pattern type corresponding to the binary character 0, and a second pattern type corresponding to the binary character 1, from a plurality of pattern types available for use. In another example, if the embedded data contains information that can be expressed by at least one of the decimal characters 0 to 7, the pattern determinator 13 may select first to eighth pattern types respectively corresponding to the decimal characters 0 to 7, from the plurality of pattern types available for use.

Once the pattern types are determined for the plurality of patterns, the pattern determinator 13 may further determine one or more colors to be used for the plurality of patterns based on the information contained in the embedded data. For example, a specific color may be assigned to each one of the pattern types of the plurality of patterns. Alternatively, the black color may be assigned to each one of the pattern types by default.

The pattern determinator 13 may further determine a relative relationship to be used for the plurality of patterns based on the information contained in the embedded data.

In one example, the pattern determinator 13 may determine an arrangement to be used for the plurality of patterns based on the information contained in the embedded data. For example, if the information contained in the embedded data can be expressed by eight digits, the pattern determinator 13 may determine an arrangement of the 8-digit information, which specifies the order or the position of each digit of the 8-digit information.

In another example, the pattern determinator 13 may determine one or more angles to be used for the plurality of patterns based on the information contained in the embedded data. In this example, the angles of the plurality of patterns can be classified into two types: one type referred to as an absolute angle; and the other type referred to as a relative angle.

If the information contained in the embedded data can be expressed by either one of the binary characters 0 and 1, the pattern determinator 13 may determine a first absolute angle of the pattern corresponding to the binary character 0, and a second absolute angle of the pattern corresponding to the binary character 1. Alternatively, the information contained in the embedded data may be expressed by a relative angle of at least two patterns, which indicates the relationship of the absolute angles of the at least two patterns.

Any one of the pattern type, color, and relative relationship to be used fox the plurality of patterns, which are determined by the pattern determinator 13, may be stored for further processing.

The pattern embedder 14 embeds the plurality of patterns into the embedded area of the original image to generate an embedded image. For example, the pattern embedder 14 may generate the plurality of patterns using the pattern type, color, and relative relationship that are determined by the pattern determinator 13. Accordingly, the plurality of patterns of the embedded image has the pattern type, color, and relative relationship, which are determined based on the embedded data.

The processed image output 15 combines the embedded image and the original image into a processed image. The processed image may be further output as a printed document. Alternatively, the processed image may be sent as electronic data.

Figure 2:
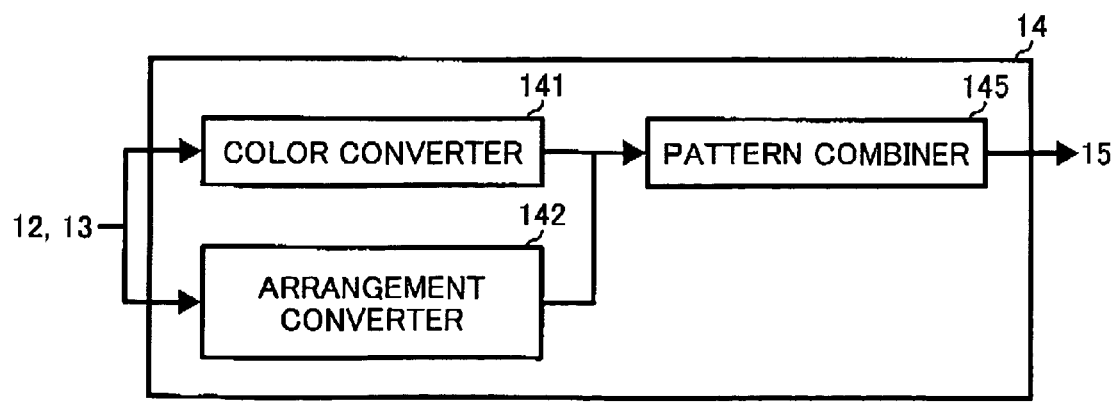
FIG. 2 is a schematic block diagram illustrating the functional structure of a pattern embedder shown in FIG. 1 according to an example embodiment of the present invention.
Figure 3:
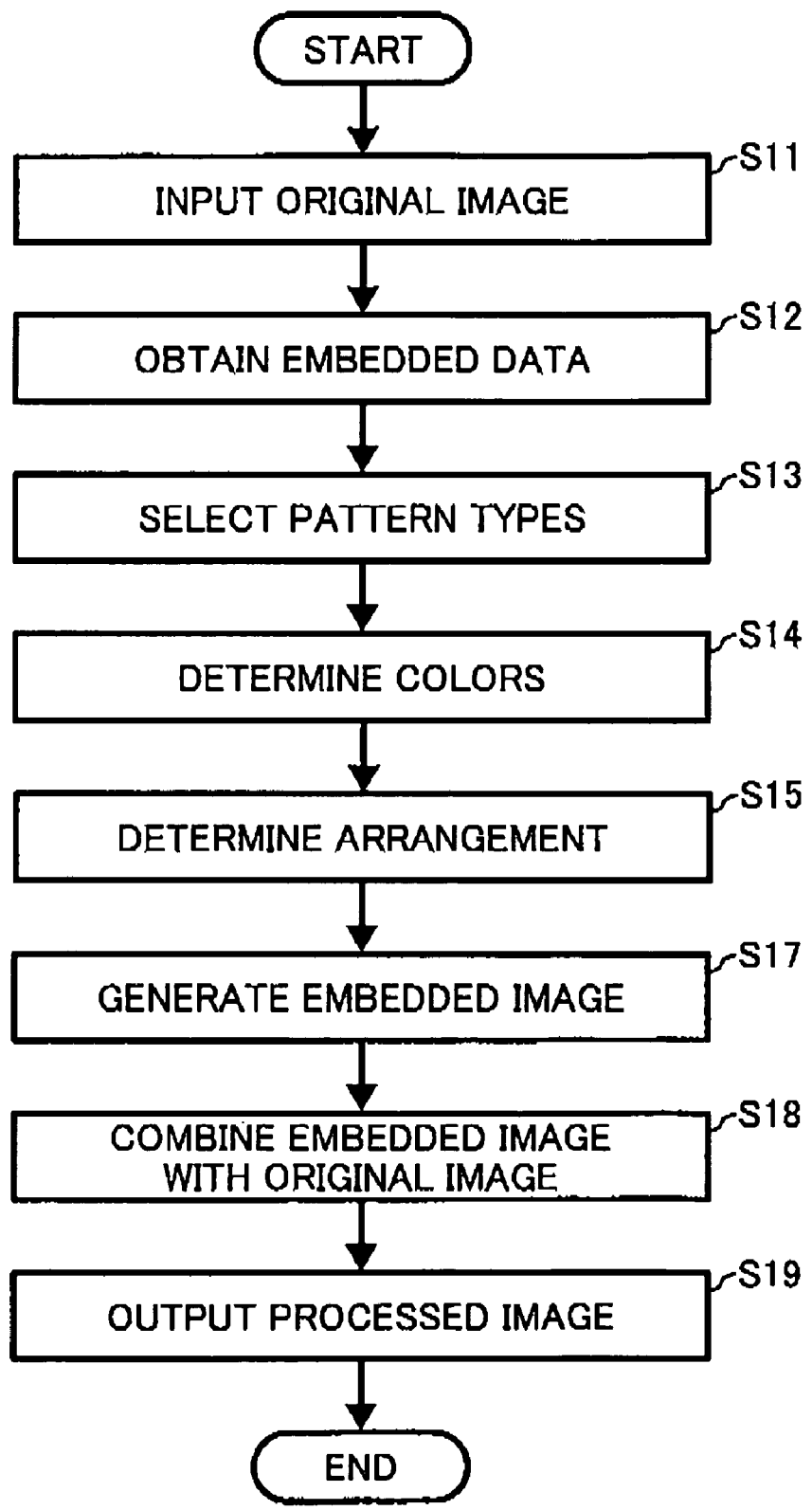
FIG. 3 is a flowchart illustrating operation of generating a processed image, performed by the embedding apparatus of FIG. 1, according to an example embodiment of the present invention.

Referring now to FIG. 3, operation of generating a processed image, performed by the embedding apparatus 10 of FIG. 1, is explained according to an example embodiment of the present invention. Specifically, in this example, the pattern embedder 14 of FIG. 1 has the functional structure shown in FIG. 2. Referring to FIG. 2, the pattern embedder 14 includes a color converter 141, an arrangement converter 142, and a pattern combiner 145.

Figure 4:
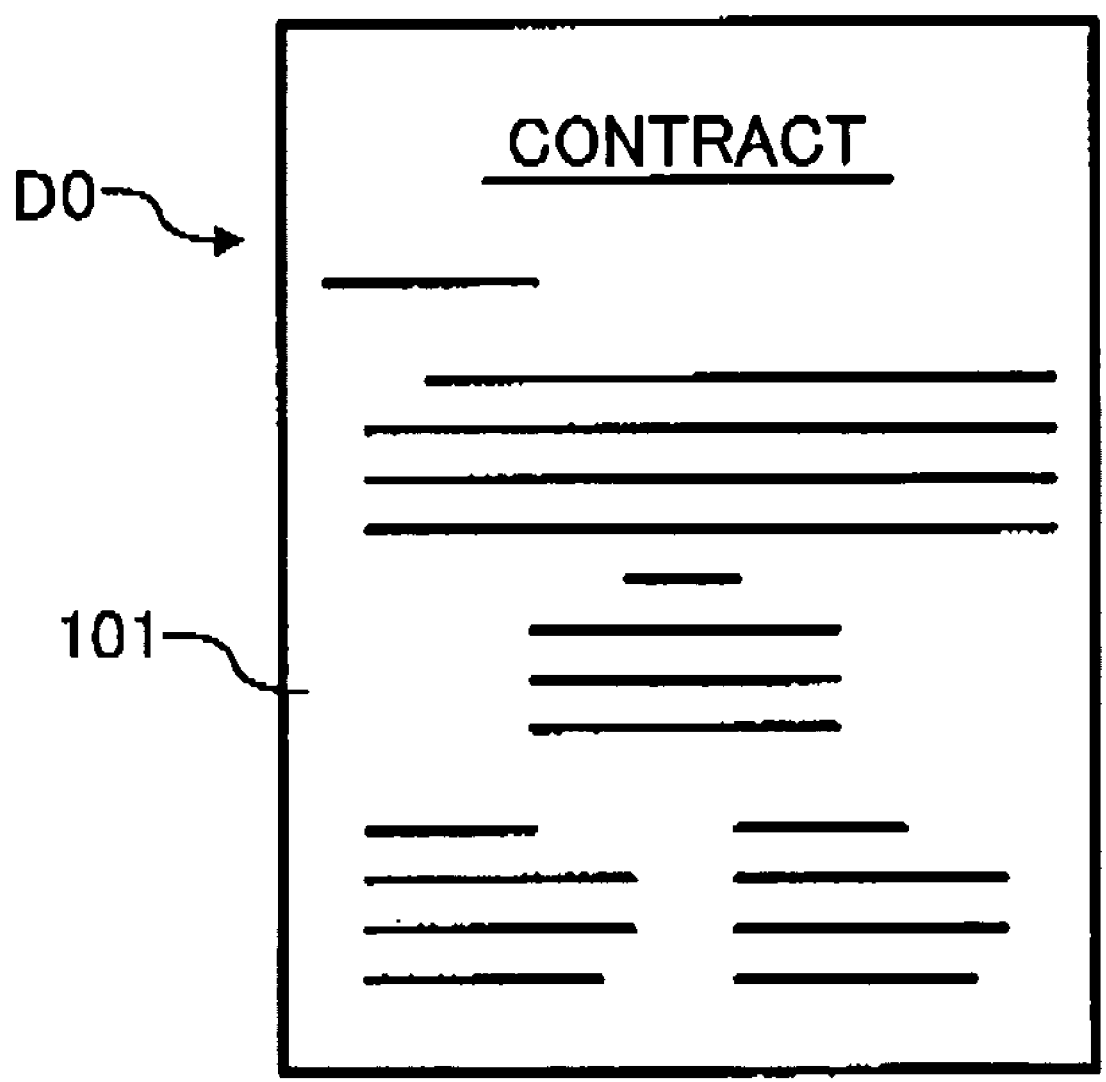
FIG. 4 is an illustration of an example original image to be processed by the embedding apparatus of FIG. 1.

Referring to FIG. 3, Step S11 inputs an original image to be processed, such as an original image D0 shown in FIG. 4, for example. The original image D0 is a multivalue image containing confidential information. As shown in FIG. 4, the original image D0 may be classified into a foreground section 101 having a plurality of characters, and a background section 102.

Step S12 obtains embedded data to be embedded into the original image D0. In this example, the embedded data is embedded into the background section 102 of the original image D0. Further, in this example, the embedded data contains binary information, which can be expressed by either one of the binary characters 0 and 1, as illustrated in any one of FIGS. 7A, 8A, and 9A. Further, the embedded data is embedded in the form of a plurality of patterns.

Step S13 selects one or more pattern types of the plurality of patterns based on the information contained in the embedded data. In this example, since the information contained in the embedded data can be expressed by either one of the binary characters 0 and 1, two pattern types are selected including a first pattern P1 of FIG. 5 corresponding to the binary character 0, and a second pattern P2 of FIG. 6 corresponding to the binary character 1. The first and second patterns P1 and P2 provide different characteristic information, such as the number of dots, density of dots, arrangement of dots, distance between dots, etc. Further, the characteristic information of the first pattern P1 and the characteristic information of the second pattern P2 are partially identical from each other. More specifically, referring to FIG. 5, the first pattern P1 contains a first dot PD1, a second dot PD2, and a third dot PD3. Referring to FIG. 6, the second pattern P2 contains a fourth dot PD4 in addition to the first, second, and third dots PD1, PD2, and PD3 that are identical to the dots of the first pattern P1. The first pattern P1 and the second patter P2 may be stored for further processing.

Step S14 of FIG. 3 determines one or more colors to be used for the plurality of patterns based on the information contained in the embedded data. In this example, the color of the first pattern P1 and the color of the first pattern P2 are determined to be partially different from each other. More specifically, the black color is assigned to each one of the first dot PD1, second dot PD2, and third dot PD3. The gray color is assigned to the fourth dot PD4. The colors of the first pattern P1 and the second pattern P2 may be stored for further processing.

Step 815 determines an arrangement to be used for the plurality of patterns based on the information contained in the embedded data. In this example, the arrangement of the plurality of patterns is determined in a corresponding manner with the size of the information contained in the embedded data.

In one example, if the first embedded data I1 of FIG. 7A having 8-bit information "01101101" is obtained, the arrangement that can form a 4×2 block may be selected as illustrated in FIG. 7B. In another example, if the second embedded data I2 of FIG. 8A having 9-bit information "011110001" is obtained, the arrangement that can form a 3×3 block may be selected as illustrated in FIG. 8B. Similarly, if the third embedded data I3 of FIG. 9A having 9-bit information "001101111" is obtained, the arrangement that can form a 3×3 block may be selected as illustrated in FIG. 9B. The arrangement determined by the pattern determinator 13 may be stored for further processing.

Referring back to FIG. 3, Step S17 embeds the plurality of patterns into the background section 102 of the original image D0 to generate an embedded image. Step S17 may be performed by the pattern embedder 14 of FIG. 1 having the functional structure of FIG. 2.

Referring to FIG. 2, the color converter 141 converts the embedded data into color information of the plurality of patterns, using the colors determined by the pattern determinator 13. In this example, the pattern determinator 13 determines the color of the first pattern P1 to be black, and the color of the second pattern P2 to be partially black and partially gray. If the digit of the information corresponds to the binary character 0, the color information representing black is obtained. If the digit of the information corresponds to the binary character 1, the color information representing the combination of black and gray is obtained.

The arrangement converter 142 converts the embedded data into arrangement information of the plurality of patterns, using the arrangement determined by the pattern determinator 13. In one example shown in FIG. 7B, the pattern determinator 13 determines that the arrangement forming the 4×2 block is used. In another example shown in FIG. 8B or 9B, the pattern determinator 13 determines that the arrangement forming the 3×3 block is used. According to the arrangement shown in any one of FIGS. 7B, 8B, and 9B, for example, the arrangement information of the plurality of patterns is obtained, which specifies the position of each digit of the information or the order of each digit relative to other digits in the information.

The pattern combiner 145 of FIG. 2 generates the plurality of patterns using the pattern types that are determined by the pattern determinator 13. Further, the pattern combiner 145 causes the plurality of patterns to have the determined colors and the determined arrangement, using the color information and the arrangement information. The plurality of patterns is then embedded into the background section 102 of the original image D0 of FIG. 4.

In the example case illustrated in FIG. 7C, the pattern embedder 14 generates eight unit areas A1 to A8 according to the arrangement shown in FIG. 7B. Further, in this example, the binary character 0 of the first embedded data I1 is embedded using the first pattern P1 having the black color dots. The binary character 1 of the first embedded data I1 is embedded using the second pattern P2 having the black color dots and the gray color dot. Accordingly, as illustrated in FIG. 7C, the first patterns P1 are respectively embedded into the unit areas A1, A4, and A7. The second patterns P2 are respectively embedded into the unit areas A2, A3, A5, A6, and A8.

In the example case illustrated in FIG. 8C, the pattern embedder 14 generates nine unit areas A1 to A9 according to the arrangement shown in FIG. 8B. Further, in this example, the binary character 0 of the second embedded data I2 is embedded using the first pattern P1 having the black color dots. The binary character 1 of the second embedded data I2 is embedded using the second pattern P2 having the black color dots and the gray color dot. Accordingly, as illustrated in FIG. 8C, the first patterns P1 are respectively embedded into the unit areas A1, A6, A7, and A8. The second patterns P2 are respectively embedded into the unit areas A2, A3, A4, A5, and A9.

In the example case illustrated in FIG. 9C, the pattern embedder 14 generates nine unit areas A1 to A9 according to the arrangement shown in FIG. 9B. Further, in this example, the binary character 0 of the third embedded data I3 is embedded using the first pattern P1 having the black color dots. The binary character 1 of the third embedded data I3 is embedded using the second pattern P2 having the black color dots and the gray color dot. Accordingly, as illustrated in FIG. 9C, the first patterns P1 are respectively embedded into the unit areas A1, A2, and A5. The second patterns P2 are respectively embedded into the unit areas A3, A4, A6, A7, A8, and A9.

Further, in this example, the plurality of patterns representing the embedded data is embedded into the entire portion of the background section 102 of the original image D0. To fill in the entire portion of the background section 102, the plurality of patterns is repeatedly embedded. Alternatively, a selected portion of the background section 102 may be embedded with one or more sets of the plurality of patterns.

Referring back to FIG. 3, Step S18 combines the embedded image and the original image into a processed image. As described above, the plurality of patterns is embedded into the entire portion of the background section 102 as illustrated in FIG. 10. In FIG. 10, the background section 102 is shown in the dark color to indicate the presence of the plurality of patterns. However, the processed image D1 of FIG. 10 may look substantially similar to the original image D0 of FIG. 4, at least to the human eye.

In this example, the size of each dot in the plurality of patterns may affect the appearance of the processed image when the processed image is output. For example, if a dot 103a, shown in FIG. 11A, having the relatively large size is used for the plurality of patterns, the plurality of patterns may be perceptible to the human eye when it is output. In another example, if a dot 103b, shown in FIG. 11B, having the relatively small size is used for the plurality of patterns, the plurality of patterns may not be perceptible to the human eye when it is output.

Referring back to FIG. 3, Step S19 outputs the processed image, and the operation ends. In one example, the processed image may be output as a printed document. In another example, the processed image may be displayed using a display device. In another example, the processed image may be output via a network.

The operation of FIG. 3 may be performed in various other ways.

In one example, as described above, Step S12 may select embedded data according to the user's preference. The user's preference may include any kind of information regarding the characteristic information of the pattern including the color of the pattern, the size of information contained in the embedded data, the processing time, the easy of detection, etc.

In another example, Step S13 may select any pattern type other than the dot pattern type described above referring to FIG. 5 or 6. For example, a line pattern type or a design pattern type may be used. Further, Step S13 may not be performed when the pattern type is previously determined.

In another example, Step S14 may not be performed when the pattern is previously set to be monochrome or any other color by default. Further, Steps S13 and S14 may be performed at the same time as the color is a part of the characteristic information of the plurality of patterns.

In another example, the characteristic information or the relative relationship of the plurality of patterns, which may be determined by the pattern determinator 13 in any one of Steps S13, S14, and S15, may be stored in the form of conversion table. Using the conversion table, Step S17 can easily convert embedded data into the plurality of patterns.

Alternatively, the characteristic information or the relative relationship of the plurality of patterns may be previously defined together with the information contained in the embedded data. In such case, Step S17 may obtain the color information or the arrangement information without performing any conversion on the embedded data. Accordingly, the pattern embedder 14 may not require any information from the embedded data obtainer 12.

In another example, Step S18 or S19 may not be performed. In such case, the embedded image may be stored in a corresponding manner with the original image for later use.

In another example, the embedded data may be embedded into any area other than the background section 102 of the original image D0. For example, the embedded data may be embedded into a selected portion of the original image D0 in the form of mark. Alternatively, as illustrated in any one of FIGS. 12 and 13, the background section 102 may be further segmented into a message area 102a and a base area 102b.

Figure 11A:
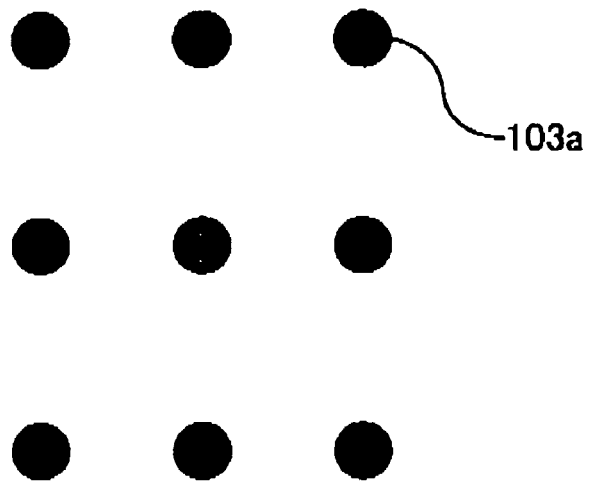
FIG. 11A is an illustration of an example first type dot contained in the processed document image of FIG. 10.
Figure 11B:
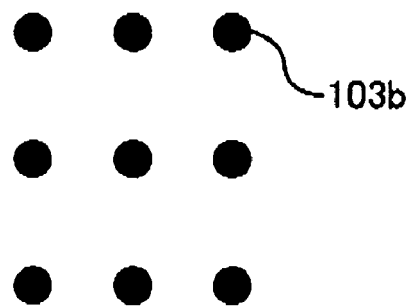
FIG. 11B is an illustration of an example second type dot contained in the processed document image of FIG. 10.
Figure 12:
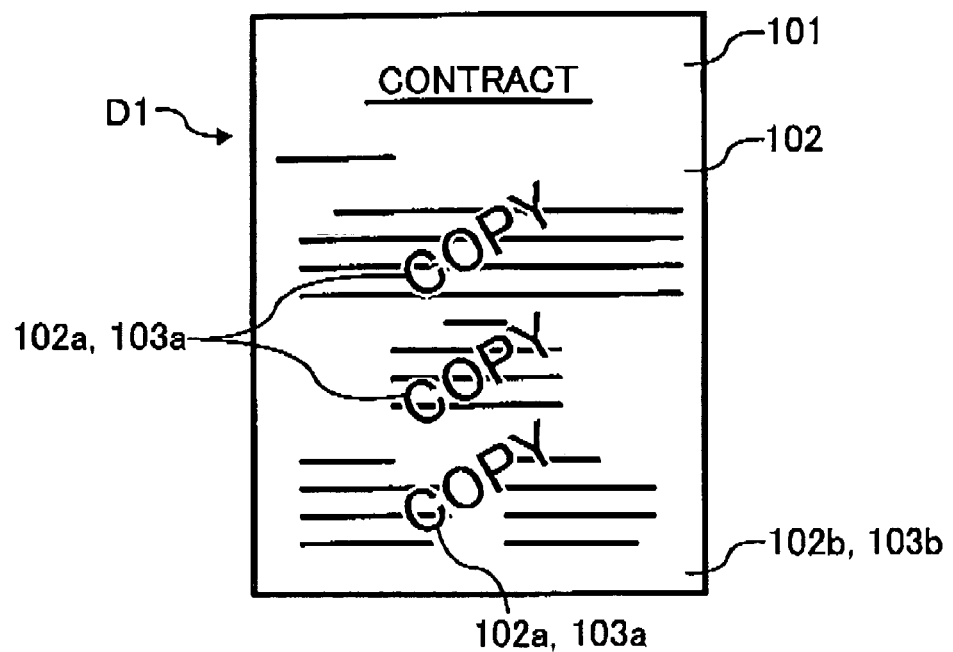
FIG. 12 is an illustration of a processed document obtained by outputting the example processed image shown in FIG. 10 according to an example embodiment of the present invention.

Referring to the processed image D1 shown in FIG. 12, the embedded data is embedded into the base area 102b in the form of a plurality of patterns with each pattern having at least one dot 103b shown in FIG. 11B. The message area 102a of the background section 102 is embedded with a plurality of patterns with each pattern having at least one dot 103a shown in FIG. 11A. When the processed image D1 of FIG. 12 is output, the dot 103a of the message area 102a becomes visible to the user, while the dot 103b of the base area 102b remains invisible.

Figure 13:
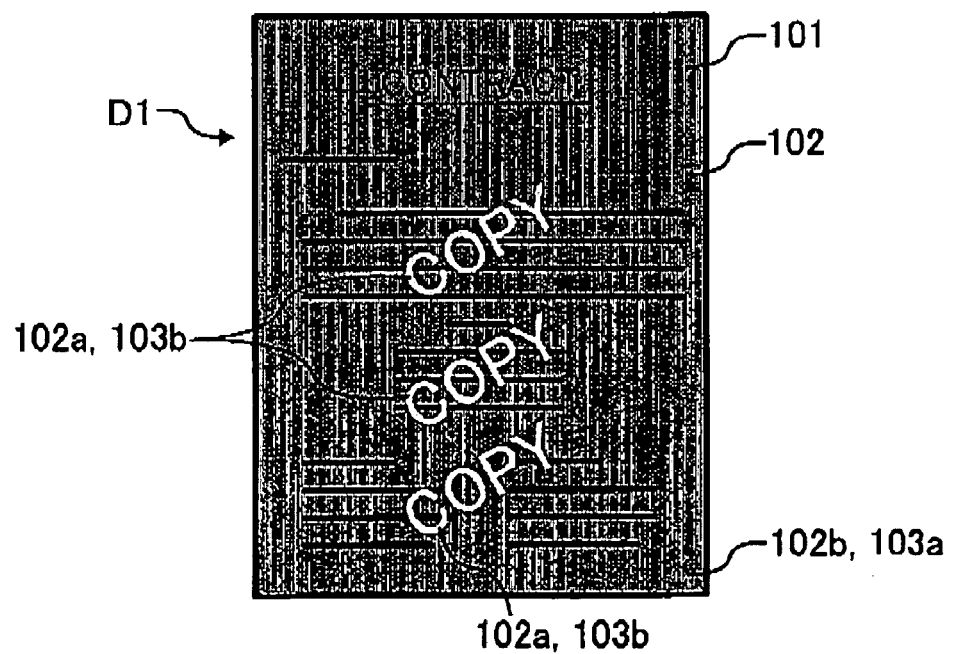
FIG. 13 is an illustration of a processed document obtained by outputting the example processed image shown in FIG. 10 according to an example embodiment of the present invention.

Referring to the processed image D1 shown in FIG. 13, the embedded data is embedded into the base area 102b in the form of a plurality of patterns with each pattern having at least one dot 103a shown in FIG. 11A. The message area 102a of the background section 102 is embedded with a plurality of patterns with each pattern having at least one dot 103b shown in FIG. 11. When the processed image D1 of FIG. 13 is output, the dot 103a of the base area 102b becomes visible to the user, while the dot 103b of the message area 102a remains invisible.

As described above, by determining the arrangement of the plurality of patterns based on the embedded data, the amount of the embedded data contained in the plurality of patterns can be easily adjusted. Further, the amount of the embedded data can be adjusted by determining a number of pattern types of the plurality of patterns. More specifically, the amount of embedded data I is expressed by the following equation if the binary system is used:

$I=n*\log_2 N$, wherein n corresponds to the number of unit areas that is specified by the arrangement of the plurality of patterns, and N corresponds to the number of pattern types of the plurality of patterns.

Figure 15:
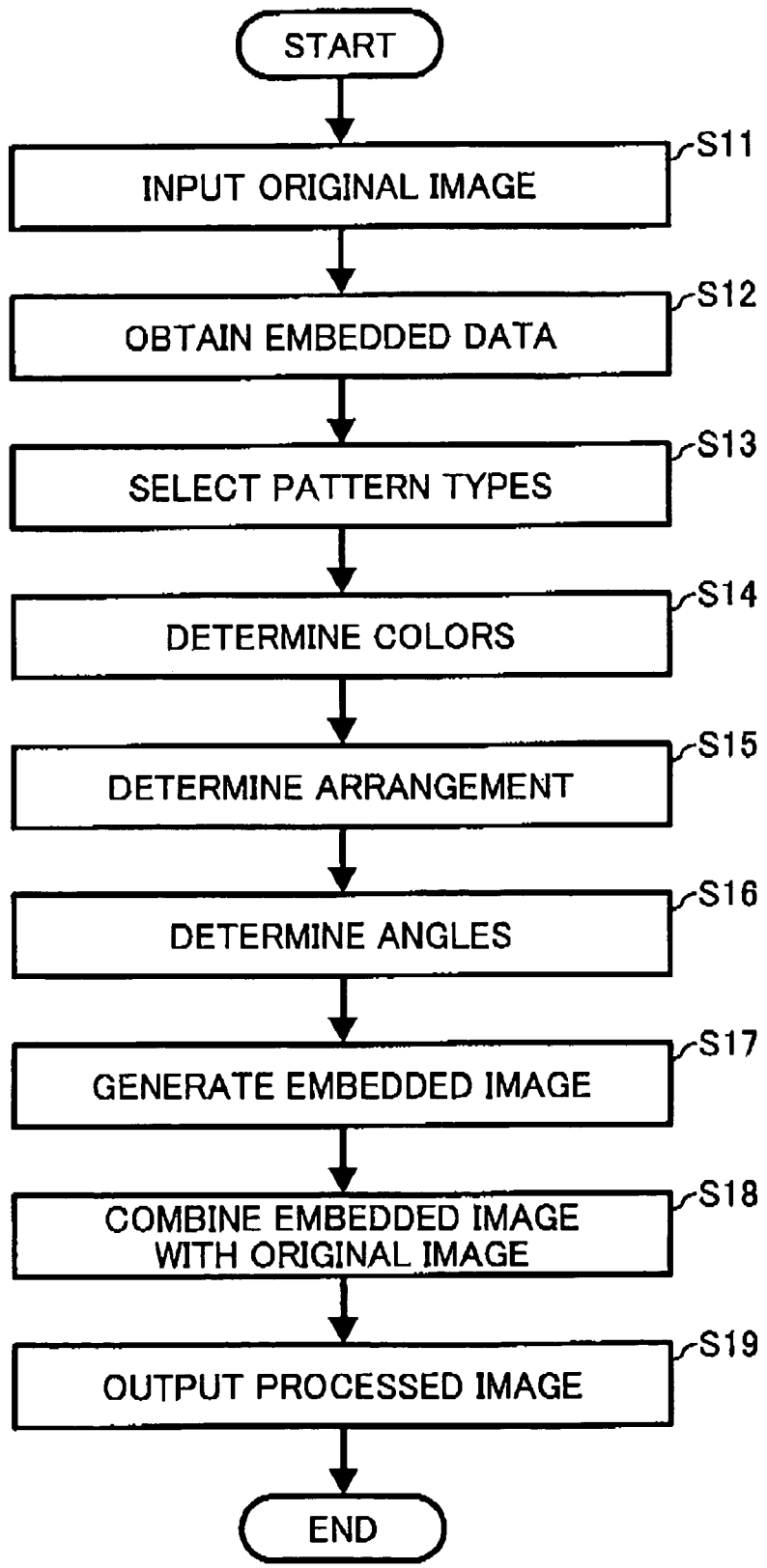
FIG. 15 is a flowchart illustrating operation of generating a processed image, performed by the image processing apparatus of FIG. 1, according to an example embodiment of the present invention.

Referring now to FIG. 15, operation of generating a processed image, performed by the embedding apparatus 10 of FIG. 1, is explained according to an example embodiment of the present invention. The operation of FIG. 15 is substantially similar to the operation of FIG. 3. The differences include the addition of Step S16, and the functional structure of the pattern embedder 14 of FIG. 1.

Figure 14:
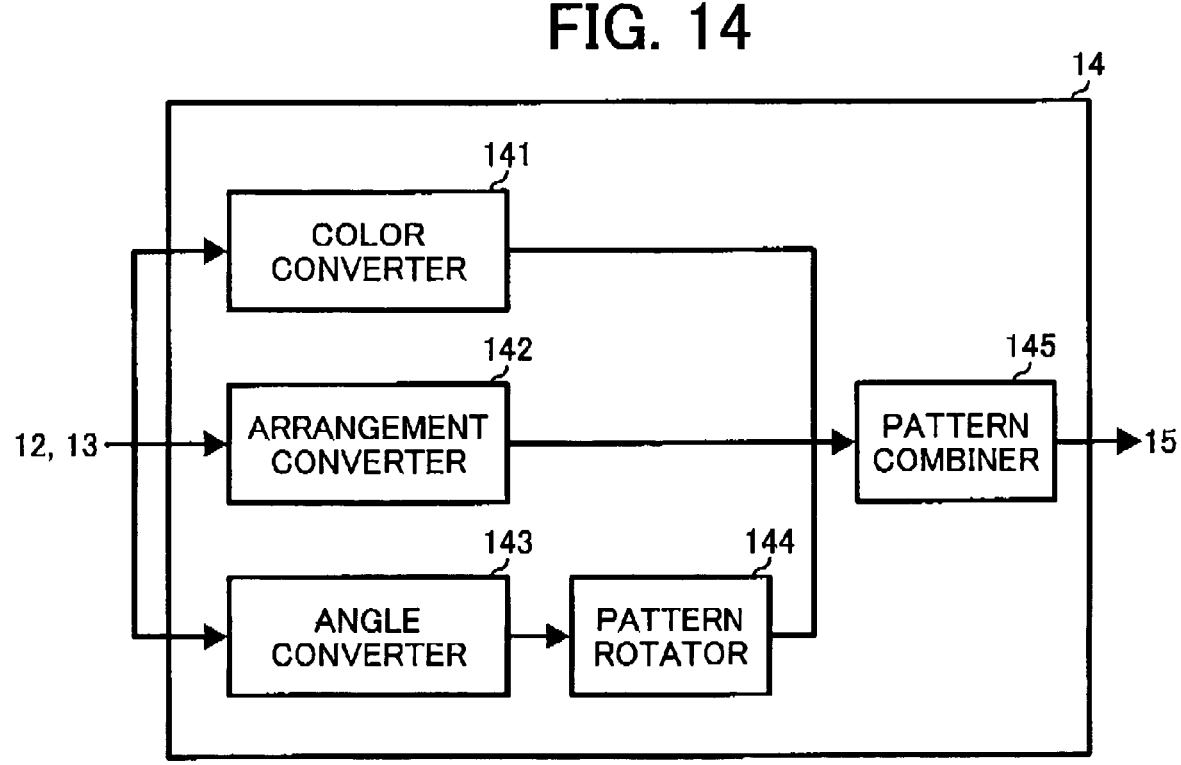
FIG. 14 is a schematic block diagram illustrating the functional structure of a pattern embedder shown in FIG. 1 according to an example embodiment of the present invention.

Specifically, in this example, the pattern embedder 14 of FIG. 1 has the functional structure shown in FIG. 14. Referring to FIG. 14, the pattern embedder 14 includes the color converter 141, the arrangement converter 142, the pattern combiner 145, an angle converter 143, and a pattern rotator 144.

Referring to FIG. 15, Step S16 determines one or more angles to be used for the plurality of patterns based on the information contained in the embedded data. In this example, each one of the plurality of patterns has two types of angles: one referred to as an absolute angle and the other referred to as a relative angle.

The absolute angle is an angle of the pattern relative to the upright position of the pattern, i.e., the upright position of the original image. The absolute angle can be any value between 0 and 360 degrees. However, a predetermined number of angles may be used, which may be obtained by quantizing the continuous range of angle based on a predetermined unit angle u1. In this example, the continuous range of angle, i.e., 360 degrees is divided by the unit angle u1 of 60 degrees to obtain six levels of the absolute angles. In this example, the number of levels of the absolute angles, or the number of absolute angles, is referred to as a quantization number q.

Figure 5:
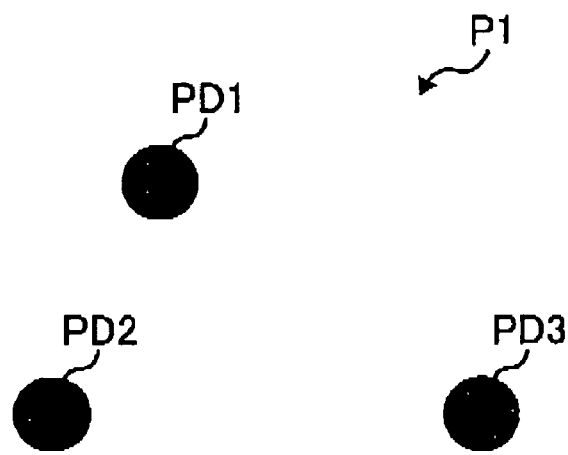
FIG. 5 is an illustration of a first pattern to be embedded by the embedding apparatus of FIG. 1 according to an example embodiment of the present invention.
Figure 6:
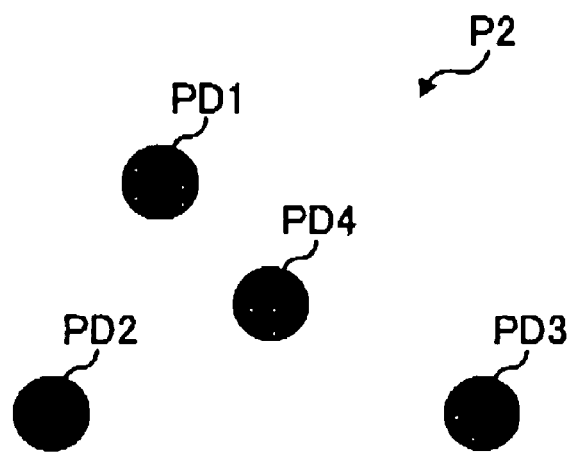
FIG. 6 is an illustration of a second pattern to be embedded by the embedding apparatus of FIG. 1 according to an example embodiment of the present invention.
Figure 16:
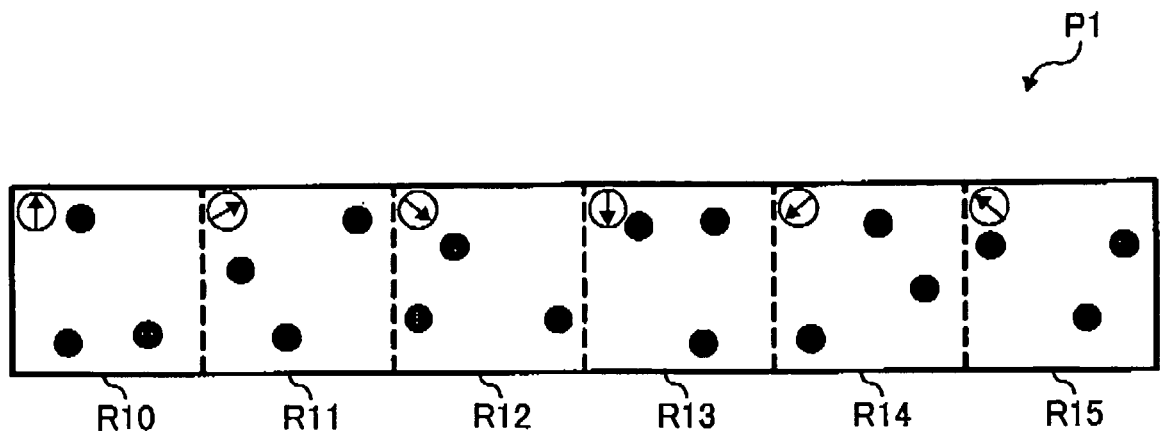
FIG. 16 is an illustration of a plurality of first patterns each having a different absolute angle according to an example embodiment of the present invention.

More specifically, the absolute angle of the first pattern P1 of FIG. 5 may be expressed by at least one of the six angles illustrated in FIG. 16. Referring to FIG. 16, the first pattern P1 has the absolute angle R10 when it is placed in the upright position. The first pattern P1 has the absolute angle R11 when it is placed in the position rotated by one unit angle, i.e., 60 degrees, from the upright position. The first pattern P1 has the absolute angle R12 when it is placed in the position rotated by two unit angles, i.e., 120 degrees, from the upright position. The first pattern P1 has the absolute angle R13 when it is placed in the position rotated by three unit angles, i.e., 180 degrees, from the upright position. The first pattern P1 has the absolute angle R14 when it is placed in the position rotated by four unit angles, i.e., 240 degrees, from the upright position. The first pattern P1 has the absolute angle R15 when it is placed in the position rotated by five unit angles, i.e., 300 degrees, from the upright position. The arrow shown in FIG. 16 is provided to indicate the orientation of each pattern. Further, in this example, the first pattern P1 is rotated clockwise.

Figure 17:
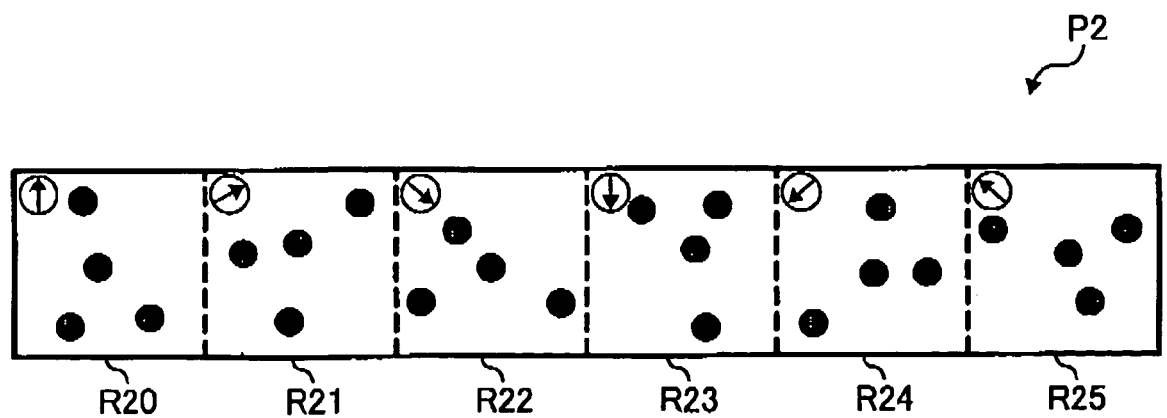
FIG. 17 is an illustration of a plurality of second patterns each having a different absolute angle according to an example embodiment of the present invention.

Similarly, in this example, the absolute angle of the second pattern P2 of FIG. 6 may be expressed by at least one of the six angles illustrated in FIG. 17. Referring to FIG. 17, the second pattern P2 has the absolute angle R20 when it is placed in the upright position. The second pattern P2 has the absolute angle R21 when it is placed in the position rotated by one unit angle, i.e., 60 degrees, from the upright position. The second pattern P2 has the absolute angle R22 when it is placed in the position rotated by two unit angles, i.e., 120 degrees, from the upright position. The second pattern P2 has the absolute angle R23 when it is placed in the position rotated by three unit angles, i.e., 180 degrees from the upright position. The second pattern P2 has the absolute angle R24 when it is placed in the position rotated by four unit angles, i.e., 240 degrees from the upright position. The second pattern P2 has the absolute angle R25 when it is placed in the position rotated by five unit angles, i.e., 300 degrees from the upright position. The arrow shown in FIG. 17 is provided to indicate the orientation of each pattern. Further, in this example, the second pattern P2 is rotated clockwise.

Further, in this example, the relative angle of the first pattern P1 and the second pattern P2 may be specified based on the unit angle u1. For example, the relative angle R0 may be specified by setting the difference in absolute angle between the first pattern P1 and the second pattern P2 to be 0 degree. Similarly, the relative angle R1 may be specified by setting the difference in absolute angle between the first pattern P1 and the second pattern P2 to be one unit angle, i.e., 60 degrees. Similarly, the relative angle R2 may be specified by setting the difference in absolute angle between the first pattern P1 and the second pattern P2 to be two unit angles, i.e., 120 degrees. Similarly, the relative angle R3 may be specified by making the difference in absolute angle between the first pattern P1 and the second pattern P2 to be three unit angles, i.e., 180 degrees. Similarly, the relative angle R4 may be specified by setting the difference in absolute angle between the first pattern P1 and the second pattern P2 to be four unit angles, i.e., 240 degrees. Similarly, the relative angle R5 may be specified by setting the difference in absolute angle between the first pattern P1 and the second pattern P2 to be five unit angles, i.e., 300 degrees.

Further, in this example, the absolute angle or the relative angle is determined based on the information contained in the embedded data.

In the example case illustrated in FIG. 18A, the first embedded data I1 having 8-bit information "01101101" is obtained. The pattern determinator 13 assigns the absolute angle R10 to the binary character 0, and the absolute angle R21 to the binary character 1. Further, the relative angle R1 is assigned to the plurality of patterns.

In the example case illustrated in FIG. 19A, the fourth embedded data I4 having 9-digit information "022220002" is obtained. The pattern determinator 13 assigns the absolute angle R10 to the decimal character 0, and the absolute angle R22 to the decimal character 2. Further, the relative angle R2 is assigned to the plurality of patterns.

In the example case illustrated in FIG. 20A, the fifth embedded data I5 having 9-digit information "551151111" is obtained. The pattern determinator 13 assigns the absolute angle R15 to the decimal character 5, and the absolute angle R21 to the decimal character 1. Further, the relative angle R4 is assigned to the plurality of patterns.

Referring back to FIG. 15, Step S17 embeds the plurality of patterns into the background section 102 of the original image D0 to generate an embedded image. In this example, Step S17 may be performed by the pattern embedder 14 having the functional structure of FIG. 14.

Referring to FIG. 14, the color converter 141 converts the embedded data into color information of the plurality of patterns using the colors determined by the pattern determinator 13, in a substantially similar manner as described referring to FIGS. 2 and 3.

The arrangement converter 142 converts the embedded data into arrangement information of the plurality of patterns, using the arrangement determined by the pattern determinator 13. In one example shown in FIG. 18B, the pattern determinator 13 determines that the arrangement forming the 4×2 block is used. In another example shown in FIG. 19B or 20B, the pattern determinator 13 determines that the arrangement forming the 3×3 block is used. According to the arrangement shown in any one of FIGS. 18B, 19B, and 20B, for example, the arrangement information of the plurality of patterns is obtained, which specifies the position of each digit of the information or the order of each digit relative to the other digits in the information.

The angle converter 143 converts the embedded data into angle information of the plurality of patterns, using the angles determined by the pattern determinator 13.

In one example shown in FIG. 18C, the pattern determinator 13 determines that the absolute angles of the first pattern P1 and the second pattern P2 to be R10 and R21, respectively. Further, the pattern determinator 13 determines that the relative angle between the first pattern P1 and the second pattern P2 to be R1. Based on this angle information, the pattern rotator 144 obtains the first pattern P1 having the absolute degree R10 and the second pattern P2 having the absolute degree R21.

In another example shown in FIG. 19C, the pattern determinator 13 determines that the absolute angles of the first pattern P1 and the second pattern P2 to be R10 and R22, respectively. Further, the pattern determinator 13 determines that the relative angle between the first pattern P1 and the second pattern P2 to be R2. Based on this angle information, the pattern rotator 144 obtains the first pattern P1 having the absolute degree R10 and the second pattern P2 having the absolute degree R22.

In another example shown in FIG. 20C, the pattern determinator 13 determines that the absolute angles of the first pattern P1 and the second pattern P2 to be R15 and R21, respectively. Further, the pattern determinator 13 determines that the relative angle between the first pattern P1 and the second pattern P2 to be R4. Based on this angle information, the pattern rotator 144 obtains the first pattern P1 having the absolute degree R15 and the second pattern P2 having the absolute degree R21.

Referring back to FIG. 14, the pattern combiner 145 generates the plurality of patterns using the pattern types that are determined by the pattern determinator 13. Further, the pattern combiner 145 causes the plurality of patterns to have the determined colors, the determined arrangement, and the determined angles, using the color information, arrangement information, and angle information. The plurality of patterns is then embedded into the background section 102 of the original image D0 of FIG. 4.

In the example case illustrated in FIG. 18C, the pattern embedder 14 generates eight unit areas A1 to A8 according to the arrangement shown in FIG. 18B. Further, in this example, the binary character 0 of the first embedded data I1 is embedded using the first pattern P1 having the absolute angle R10. The binary character 1 of the first embedded data I1 is embedded using the second pattern P2 having the absolute angle R21. Further, the first pattern P1 and the second pattern P2 are embedded so as to have the relative angle R1.

In the example case illustrated in FIG. 19C, the pattern embedder 14 generates nine unit areas A1 to A9 according to the arrangement shown in FIG. 19B. Further, in this example, the decimal character 0 of the fourth embedded data I4 is embedded using the first pattern P1 having the absolute degree R10. The decimal character 2 of the fourth embedded data I4 is embedded using the second pattern P2 having the absolute degree R22. Further, the first pattern P1 and the second pattern P2 are embedded so as to have the relative angle R2.

In the example case illustrated in FIG. 20C, the pattern embedder 14 generates nine unit areas A1 to A9 according to the arrangement shown in FIG. 20B. Further, in this example, the decimal character 5 of the fifth embedded data I5 is embedded using the first pattern P1 having the absolute degree R15. The decimal character 1 of the fifth embedded data I5 is embedded using the second pattern P2 having the absolute degree R21. Further, the first pattern P1 and the second pattern P2 are embedded so as to have the relative angle R4.

The operation shown in FIG. 15 may be performed in various other ways, for example, as described above referring to FIG. 3. Further, Step S15 may not be performed. In such case, the arrangement converter 142 of FIG. 14 may not be provided. Furthermore, in Step S16, at least one of the absolute angle and the relative angle may be determined to generate the angle information.

As described above, by determining the angles of the plurality of patterns based on the embedded data, the amount of the embedded data contained in the plurality of patterns can be easily adjusted. More specifically, the amount of embedded data I is expressed by the following equation if the binary system is used:

$I=Ra*\log_2 Rr$, wherein Ra corresponds to the number of levels of absolute angles obtained by quantizing the continuous range of angle using the unit angle u1, and Rr corresponds to the number of levels of relative angles determined by the unit angle u1. Since both the absolute angle Ra and the relative angle Rr depends on the unit angle u1 or the quantization number q=360/u1, the above equation can be simplified using the quantization number q to the following equation:

$I=q*\log_2 q$.

Figure 21:
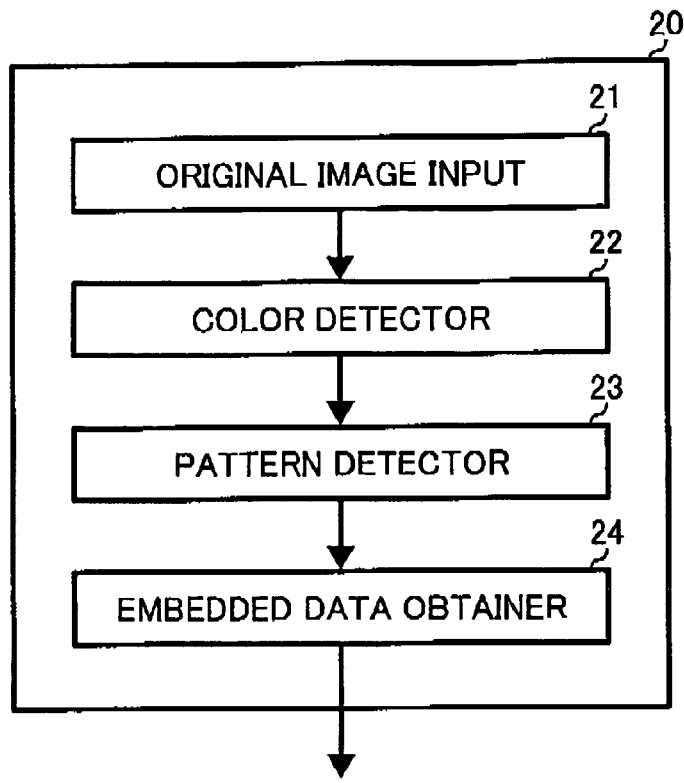
FIG. 21 is a schematic block diagram illustrating the functional structure of an extracting apparatus according to an example embodiment of the present invention.

Referring now to FIG. 21, an extracting apparatus 20 is explained according to an example embodiment of the present invention. The extracting apparatus 20 is capable of extracting embedded data from an original image, when the original image has been embedded with the embedded data. As shown in FIG. 21, the extracting apparatus 20 includes an original image input 21, a color detector 22, a pattern detector 23, and an embedded data obtainer 24.

The original image input 21 inputs an original image to be processed. In this example, the original image is presumed to include an embedded area that has been embedded with embedded data in the form of a plurality of patterns. Further, the original image may be input in various ways, for example, as described above referring to the original image input 11 of FIG. 1.

The color detector 22 extracts one or more color components from the original image, and converts the original image into a binary image having the extracted color components.

In one example, when the plurality of patterns is embedded with the green color component and the original image is input with the RGB (red, green, blue) format, the color detector 22 extracts the green color component from the original image, and generates a binary image having the green color component. In another example, when the plurality of patterns is embedded with the cyan and magenta color components and the original image is input with the RGB format, the color detector 22 first converts the original image from the RGB format to the CMY (cyan, magenta, yellow) format. The color detector 22 then extracts the cyan and magenta color components from the original image to generate a binary image having the cyan and magenta color components.

The pattern detector 23 detects the plurality of patterns from the embedded area of the original image. In this example, the pattern detector 23 detects the plurality of patterns from the binary image generated by the color detector 22 using information regarding the plurality of patterns. In one example, the pattern detector 23 detects the plurality of patterns using the pattern matching method. In another example, the pattern detector 23 detects the plurality of patterns using characteristic information of the plurality of patterns.

The embedded data obtainer 24 analyzes the plurality of patterns to obtain the embedded data of the original image. In one example, the embedded data obtainer 24 analyzes the characteristic information of the plurality of patterns, such as the pattern types of the plurality of patterns. In another example, the embedded data obtainer 24 analyzes the relative relationship of the plurality of patterns, such as the arrangement or the angles of the plurality of patterns.

Figure 22:
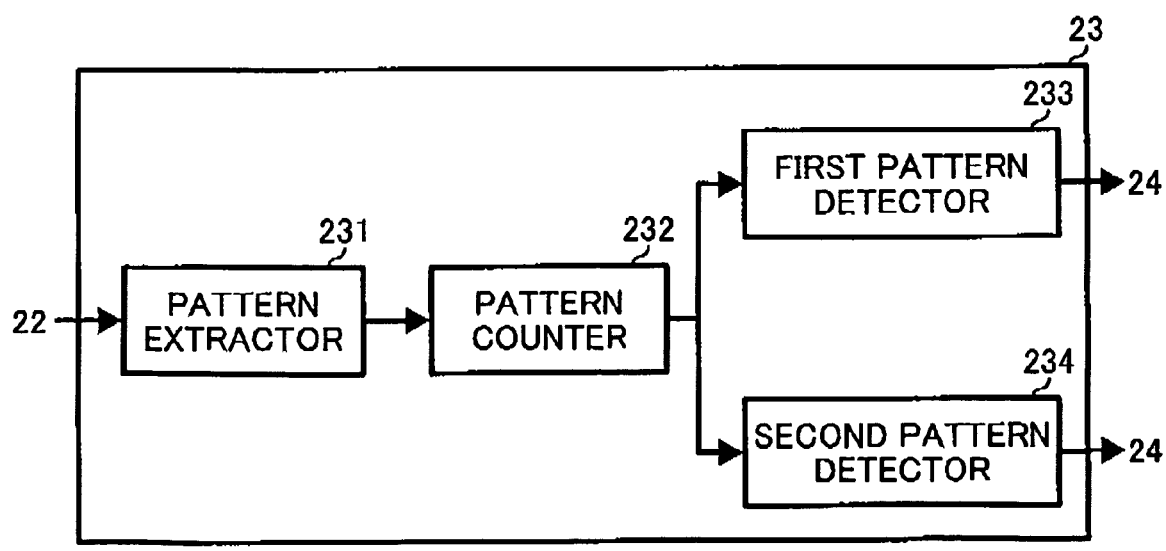
FIG. 22 is a schematic block diagram illustrating the functional structure of a pattern detector shown in FIG. 21 according to an example embodiment of the present invention.
Figure 23A:
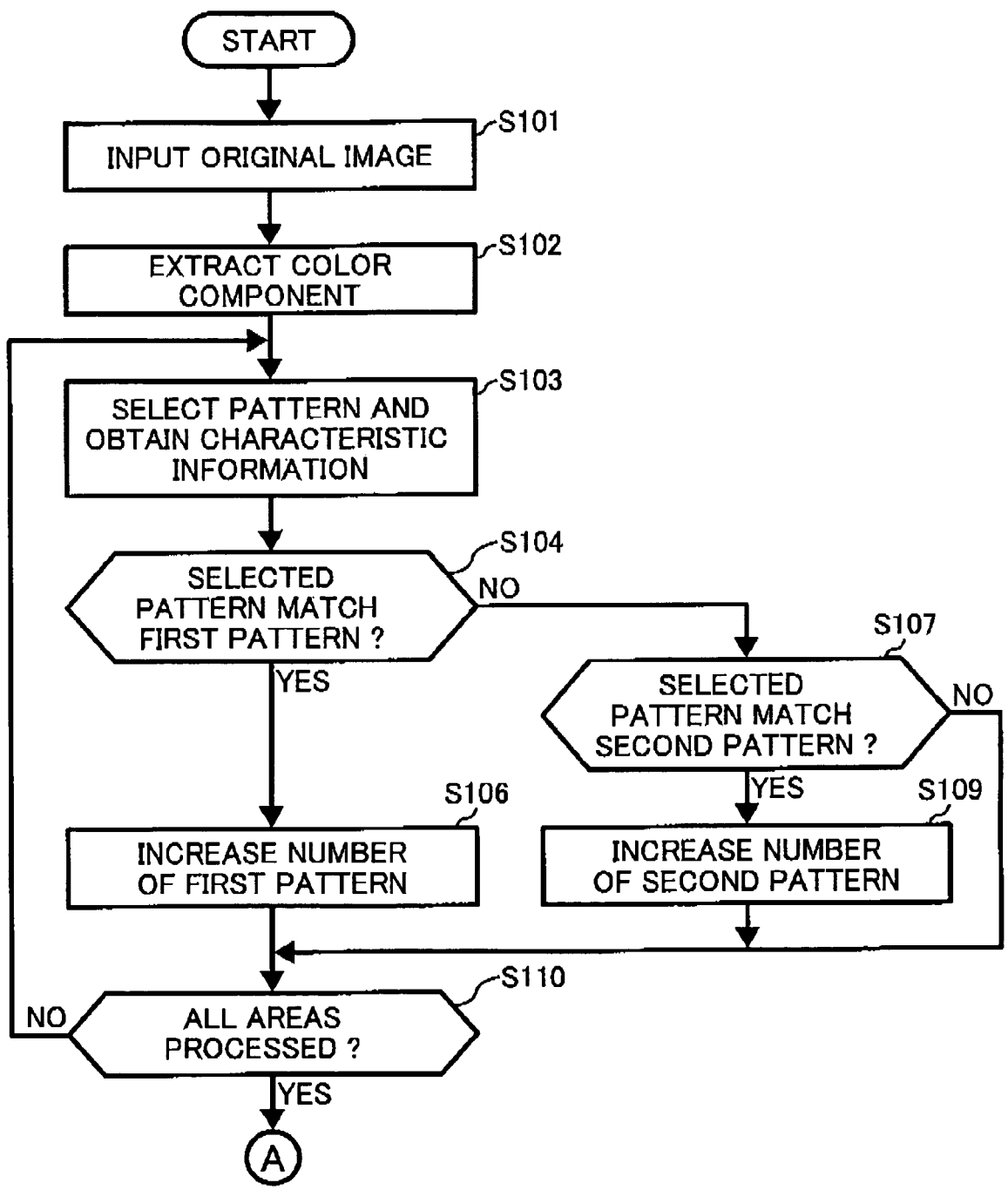
FIGS. 23A and 23B are flowcharts illustrating operation of obtaining embedded data from an original image, preformed by the extracting apparatus of FIG. 21, according to an example embodiment of the present invention.
Figure 23B:
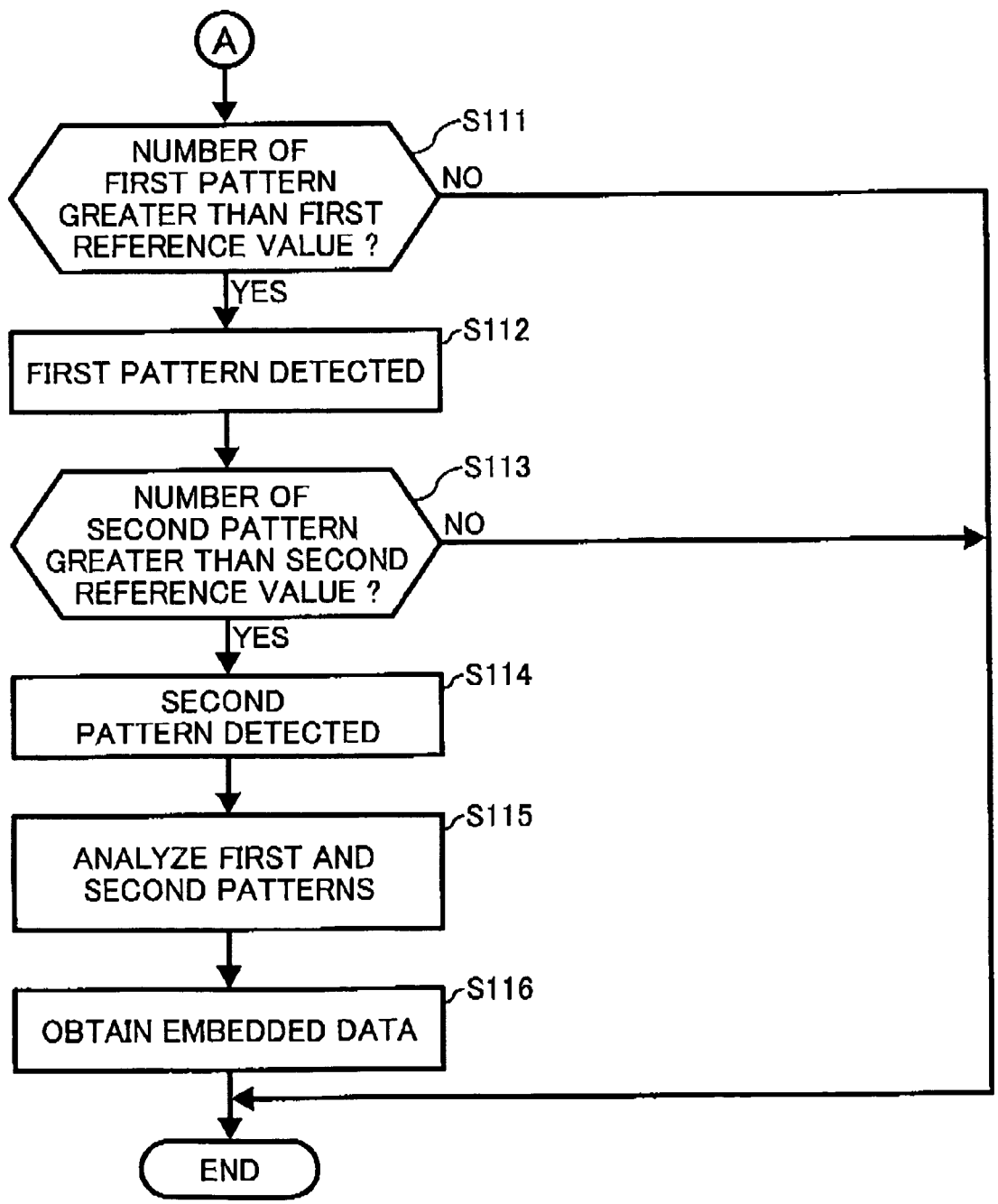

Referring now to FIGS. 23A and 23B, operation of obtaining embedded data from an original image, performed by the extracting apparatus 20 of FIG. 21, is explained according to an example embodiment of the present invention. Specifically, in this example, the pattern detector 23 of FIG. 21 has the functional structure shown in FIG. 22. Referring to FIG. 22, the pattern detector 23 includes a pattern extractor 231, a pattern counter 232, a first pattern detector 233, and a second pattern detector 234.

Referring to FIG. 23A, Step S101 inputs an original image to be processed, such as the processed image D1 of FIG. 10, for example. As shown in FIG. 10, the processed image D1 has the background section 102, to which embedded data is embedded in the form of a plurality of patterns. Further, in this example, the processed image D1 is input with the RGB format.

Further, in this step, the original image input 21 may determine whether the processed image D1 is in the upright position. If the processed image D1 is not in the upright position, the processed image D1 is rotated to be in the upright position.

Step S102 extracts one or more color components from the background section 102 of the processed image D1. In this example, color component information of the plurality of patterns, which indicates the color components used for the plurality of patterns, is stored in a memory of the extracting apparatus 20 of FIG. 1. Alternatively, the color component information may be provided from the user, if such information is known to the user. Alternatively, the color component information may be obtained from the processed image D1, if such information has been embedded in the processed image D1 together with the plurality of patterns.

Specifically, in this example, the plurality of patterns is presumed to be embedded with the cyan and magenta color components. Using this color component information, the color detector 22 converts the background section 102 of the processed image D1 from the RGB format to the CMY format. The color detector 22 then extracts the cyan and magenta components from the background section 102. Once the cyan and magenta components are extracted, the color detector 22 generates a binary image by assigning the value 1 to the cyan and magenta components and the value 0 to the yellow component of the background section 102. From the binary image, the pattern detector 23 detects the plurality of patterns using characteristic information of the pluratliy of patterns, as described below referring to Steps S103 to S114. More specifically, in this example, the pattern detector 23 having the functional structure shown in FIG. 22 detects the first pattern P1 of FIG. 5 and the second pattern P2 of FIG. 6.

In Step S103, the pattern extractor 231 divides the binary image into a plurality of unit areas, and selects one of the plurality of unit areas for further processing. In this example, each unit area is embedded with the corresponding one of the plurality of patterns. From the pattern detected in the selected unit area ("the selected pattern"), the characteristic information of the pattern is obtained. The characteristic information may include any kind of information obtainable from the pattern, such as the number of dots, density of dots, distance between dots, etc.

In Step S104, the first pattern detector 233 determines whether the selected pattern matches the first pattern P1 by comparing the characteristic information of the selected pattern with the characteristic information of the first pattern P1. The characteristic information of the first pattern P1 may be stored in the first pattern detector 233. If the characteristic information of the selected pattern is substantially similar to the characteristic information of the first pattern P1 ("YES" in Step S104), the operation proceeds to Step S106 to increase a detected number of the first pattern P1 by one. If the characteristic information of the selected pattern is different from the characteristic information of the first pattern P1 ("NO" in Step S104), the operation proceeds to Step S107.

In Step S107, the second pattern detector 234 of FIG. 22 determines whether the selected pattern matches the second pattern P2 by comparing the characteristic information of the selected pattern with the characteristic information of the second pattern P2. The characteristic information of the second pattern P2 may be stored in the second pattern detector 234. If the characteristic information of the selected pattern is substantially similar to the characteristic information of the second pattern P2 ("YES" in Step S107), the operation proceeds to Step S109 to increase a detected number of the second pattern P2 by one. If the characteristic information of the selected pattern is different from the characteristic information of the second pattern P2 ("NO" in Step S109), the operation proceeds to Step S110.

In Step S110, the pattern extractor 231 determines whether all unit areas of the binary image are processed. If all unit areas have been processed ("YES" in Step S110), the operation proceeds to Step S111 of FIG. 23B. If all unit areas have not been processed ("NO" in Step S110), the operation returns to Step S103 to select another unit area to determine whether the selected pattern matches either one of the first pattern P1 and the second pattern P2.

Referring to FIG. 23B, in Step S111, the first pattern detector 233 of FIG. 23 determines whether the detected number of the first pattern P1 is greater than a first reference value Ref1. In this example, the first reference value Ref1 is previously stored in the first pattern detector 233. If the detected number is greater than the first reference value Ref1 ("YES" in Step S111), the operation proceeds to step S112 to determine that the first pattern P1 is detected and output information regarding the detected first pattern P1 to the embedded data obtainer 24. If the detected number is equal to or less than the first reference value Ref1 ("NO" in Step S111), the operation ends to return an error message indicating that the first pattern P1 is not detected.

In Step S113, the second pattern detector 234 of FIG. 22 determines whether the detected number of the second pattern P2 is greater than a second reference value Ref2. In this example, the second reference value Ref2 is stored in the second pattern detector 234. If the detected number is greater than the second reference value Ref2 ("YES" in Step S113), the operation proceeds to Step S114 to determine that the second pattern P2 is detected and output information regarding the detected second pattern P2 to the embedded data obtainer 24. If the detected number is equal to or less than the second reference value Ref2 ("NO" in Step S113), the operation ends to return an error message indicating the second pattern P2 is not detected.

Referring back to FIG. 23B, in Step S115, the embedded data obtainer 24 of FIG. 22 analyzes the first pattern P1 and the second pattern P2, which are detected by the pattern detector 23. In this example, the first pattern P1 and the second pattern P2 are analyzed using the arrangement information of the plurality of patterns, which may be stored in a memory of the extracting apparatus 20 of FIG. 1. Alternatively, the arrangement information may be provided from the user, if such information is known to the user. Alternatively, the arrangement information may be obtained from the processed image D1, if such information has been embedded in the processed image D1 together with the plurality of patterns.

In one example, if the arrangement information indicates that the arrangement forming the 4×2 block shown in FIG. 18B is used for the plurality of patterns, the embedded data obtainer 24 extracts a set of the first pattern P1 and the second pattern P2, which can form the 4×2 block, from the detected first pattern P1 and the second pattern P2.

In another example, if the arrangement information indicates that the arrangement forming the 3×3 block shown in FIG. 19B or 20B is used for the plurality of patterns, the embedded data obtainer 24 extracts a set of the first pattern P1 and the second pattern P2, which can form the 3×3 block, from the detected first pattern P1 and the second pattern P2.

Referring back to FIG. 23B, in Step S116, the embedded data obtainer 24 obtains the embedded data of the processed image D1. For example, the embedded data obtainer 24 converts the extracted set of the first pattern P1 and the second pattern P2 into a set of the binary character 0 and the binary character 1.

The operation shown in FIGS. 23A and 23B may be performed in various other ways.

In one example, Step S102 of extracting one or more color components may not be performed, when the black color component is used for the plurality of patterns and the original image is input as a binary image. In such case, the binary image may be provided directly from the original image input 21 to the pattern detector 23. Accordingly, the color detector 22 may not be provided.

In another example, the pattern detector 23 of FIG. 21 may first determine whether the original image is embedded with embedded data. For example, one-bit information indicating whether the embedded data has been embedded may be previously embedded in the original image together with the plurality of patterns.

Alternatively, the pattern counter 232 of FIG. 22 may count the number of a plurality of patterns that matches either one of the first pattern P1 and the second pattern P2, which can be detected by the pattern extractor 231. As shown in FIGS. 5 and 6, any pattern that matches either one of the first pattern P1 and the second pattern P2 ("the detected pattern") can be extracted using the characteristic information common to the first pattern P1 and the second pattern P2, i.e., the characteristic information of the first, second, and third dots PD1, PD2, and PD3. If the number of the detected patterns is greater than a third reference value, the pattern counter 232 determines that at least one of the first pattern P1 and the second pattern P2 is detected, and provides information regarding the detected pattern to the first pattern detector 233 or the second pattern detector 234. If the number of the detected patterns is equal to or less than the third reference value, the pattern counter 232 determines that none of the first pattern P1 and the second pattern P2 is detected, and sends an error message indicating that no pattern is detected. The third reference value may be stored in a memory of the extracting apparatus 20.

In another example, the plurality of patterns may be detected from a selected portion of the background section 102. In such case, the number of unit areas to be processed may be reduced.

In another example, Steps S103 to S114 of detecting the first pattern P1 and the second pattern P2 may be performed in various other ways. For example, the first pattern P1 or the second pattern P2 may be detecting using the pattern matching method.

Figure 24:
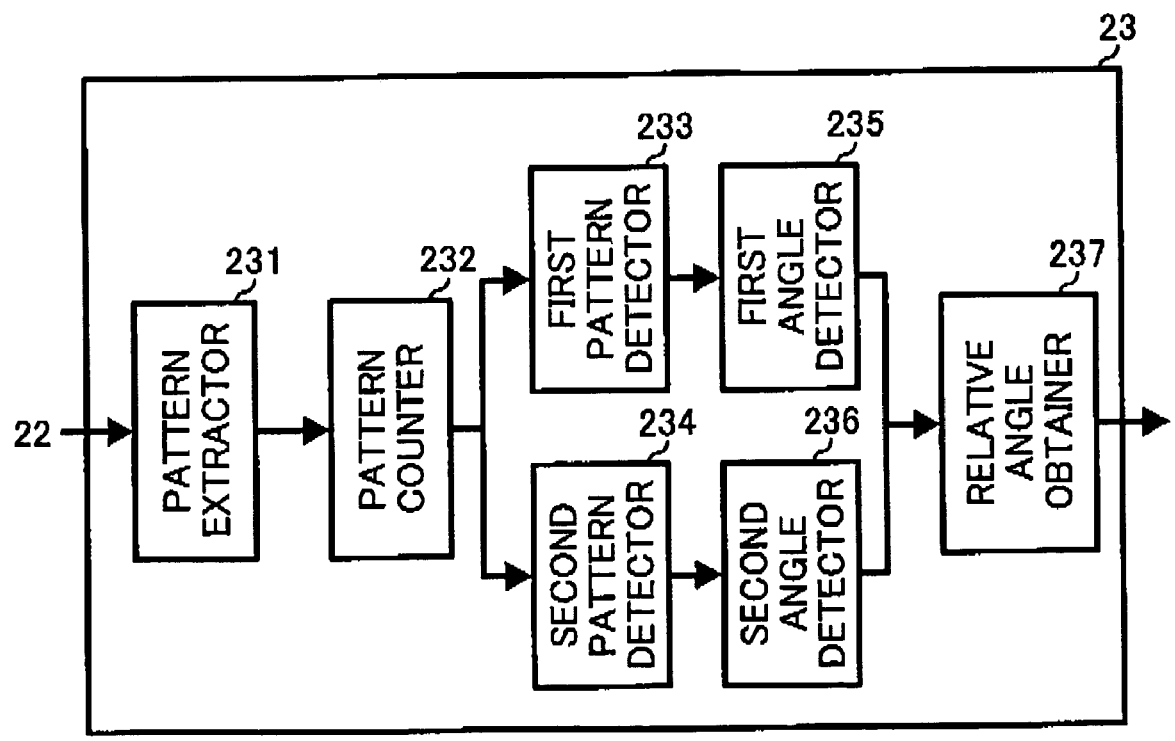
FIG. 24 is a schematic block diagram illustrating the functional structure of a pattern detector shown in FIG. 21 according to an example embodiment of the present invention.
Figure 25A:
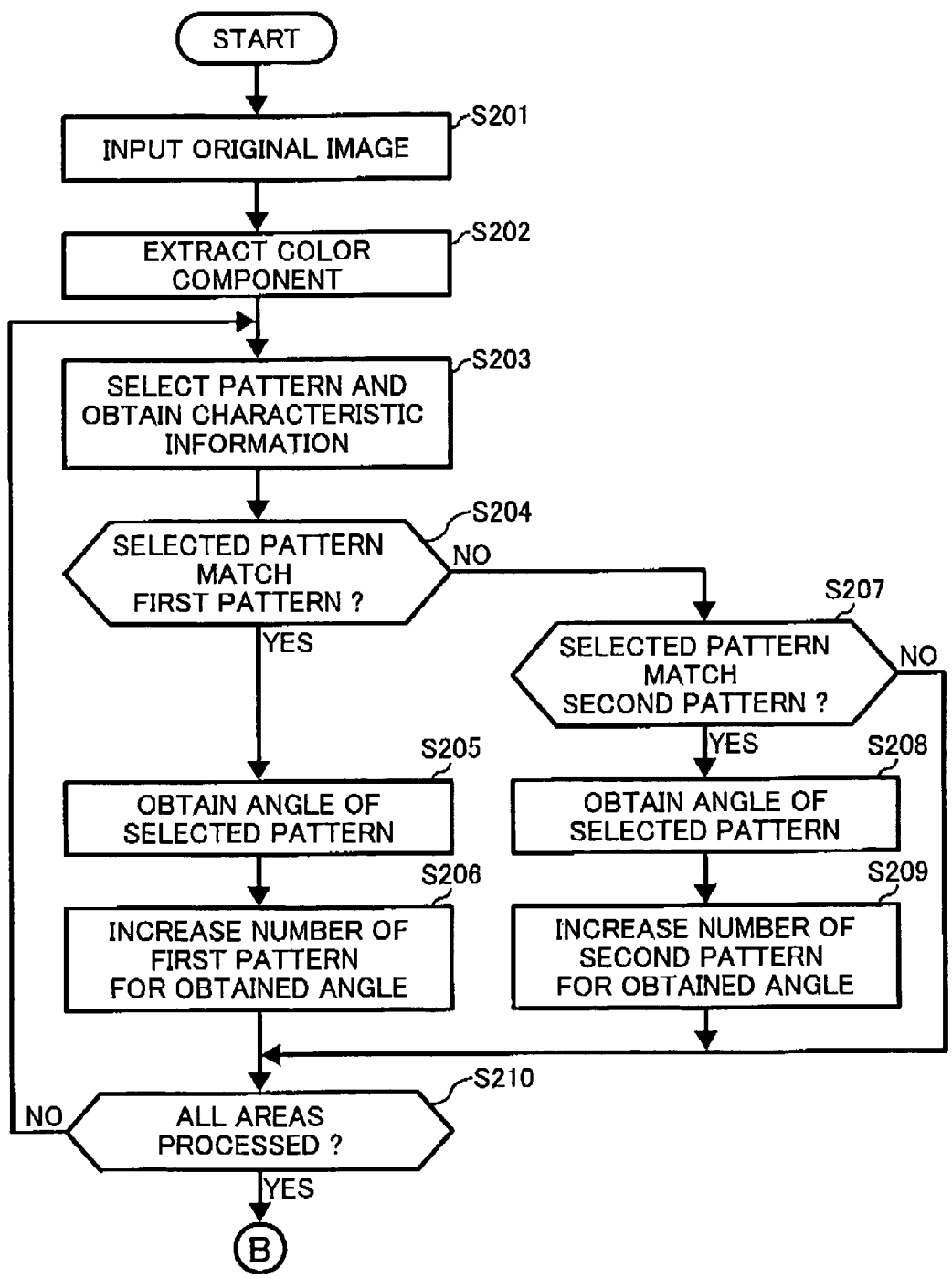
FIGS. 25A and 25B are flowcharts illustrating operation of obtaining embedded data from an original image, performed by the extracting apparatus of FIG. 21, according to an example embodiment of the present invention.
Figure 25B:
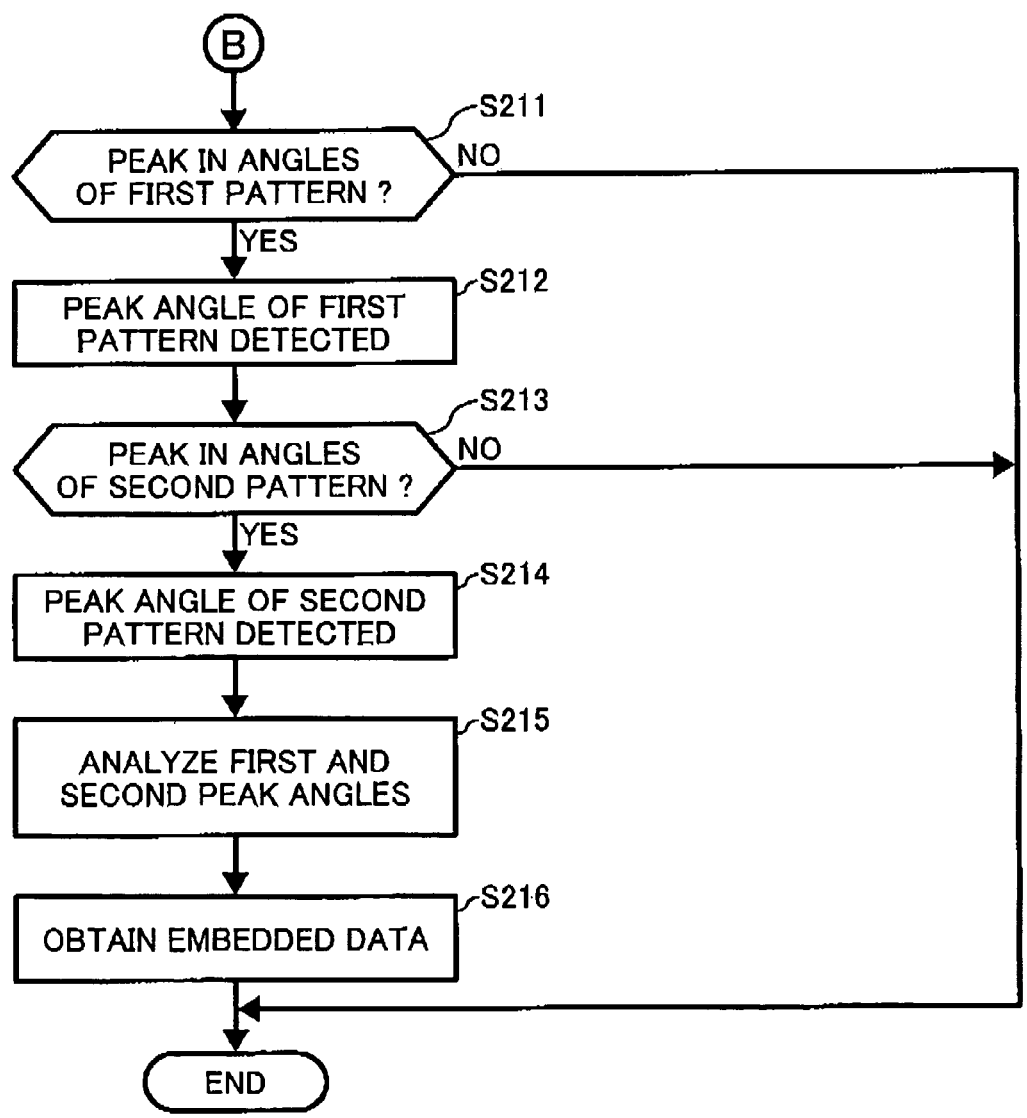

Referring now to FIGS. 25A and 25B, operation of obtaining embedded data from an original image, performed by the extracting apparatus 20 of FIG. 21, is explained according to an example embodiment of the present invention. Specifically, in this example, the pattern detector 23 of FIG. 21 has the functional structure shown in FIG. 24. Referring to FIG. 24, the pattern detector 23 includes a first angle detector 235, a second angle detector 236, and a relative angle obtainer 237, in addition to the pattern extractor 231, the pattern counter 232, the first pattern detector 233, and the second pattern detector 234 of FIG. 22.

Referring to FIG. 25A, Step S201 inputs an original image to be processed, such as the processed image D1 of FIG. 10, for example. As shown in FIG. 10, the processed image D1 has the background section 102, to which embedded data is embedded in the form of a plurality of patterns. Further, in this example, the processed image D1 is input with the RGB format.

Further, in this step, the original image input 21 may determine whether the processed image D1 is in the upright position. If the processed image D1 is not in the upright position, the processed image D1 is rotated to be in the upright position.

Step S202 extracts one or more color components from the background section 102 of the processed image D1 in a substantially similar manner as described referring to Step S102 of FIG. 23A. Specifically, in this example, the color detector 22 generates a binary image by assigning the value 1 to the cyan and magenta components and the value 0 to the yellow component of the background section 102 of the processed image D1. From the binary image, the pattern detector 23 detects the plurality of patterns using characteristic information and relative relationship of the plurality of patterns, as described below referring to Step S203 to S214. More specifically, in this example, the pattern detector 23 having the functional structure shown in FIG. 24 detects a relative angle of the first pattern P1 of FIG. 5 and the second pattern P2 of FIG. 6.

In Step S203, the pattern extractor 231 divides the binary image into a plurality of unit areas, and obtains a selected pattern from one of the plurality of unit areas in a substantially similar manner as described referring to Step S103 of FIG. 23A. The pattern extractor 231 further obtains characteristic information of the selected pattern.

In Step S204, the first pattern detector 233 determines whether the selected pattern matches the first pattern P1 by comparing the characteristic information of the selected pattern with the characteristic information of the first pattern P1. In this example, the characteristic information of the first pattern P1 is stored for each one of the absolute angles obtainable from the first pattern P1. As described above referring to FIG. 15, the number of absolute angles is determined based on the unit angle u1. If the unit angle u1 is determined to be 60 degrees, the characteristic information of the first pattern P1 is stored for each one of the six absolute angles R10, R11, R12, R13, R14, and R15 as shown in FIG. 16. If the characteristic information of the selected pattern is substantially similar to the characteristic information of the first pattern P1 having at least one of the absolute angles R10 to R15 ("YES" in Step S204), the operation proceeds to Step S205. If the characteristic information of the selected pattern is not similar to the characteristic information of the first pattern P1 having at least one of the absolute angles R10 to R15 ("NO" in Step S204), the operation proceeds to Step S207.

Figure 26:
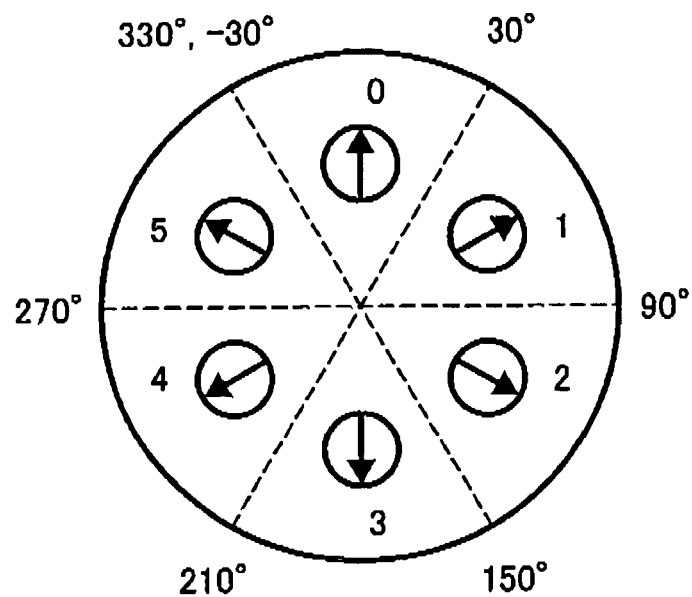
FIG. 26 is an illustration for explaining operation of obtaining an angle of a plurality of patterns according to an example embodiment of the present invention.

In Step S205, the first angle detector 235 obtains the absolute angle of the selected pattern, i.e., the first pattern P1. Since the first pattern P1 has six levels of absolute angles, the detected angle of the selected pattern is presumed to correspond to at least one of the six absolute angles R10 to R15 shown in FIG. 16. More specifically, in this example, the first angle detector 235 determines whether the value of detected angle belongs to at least one of a plurality of ranges, with each range corresponding to each level of the absolute angles. For example, as illustrated in FIG. 26, if the selected pattern has the detected angle that falls in the range from 0 to 30 degrees or from 330 to 360 degrees (−30 to 30 degrees), the first angle detector 235 determines that the selected pattern has the absolute angle R10. Similarly, if the selected pattern has the detected angle that falls in the range from 30 to 90 degrees, the first angle detector 235 determines that the selected pattern has the absolute angle R11.

In Step S206, the first angle detector 235 increases, by one, a detected number of the first pattern P1 for the absolute angle obtained in the previous step. For example, if the absolute angle R10 is obtained in Step S206, the first angle detector 235 increases the detected number of the first pattern P1 having the absolute angle R10. In this manner, the detected number of the first pattern P1 is obtained for each one of the absolute angles R10 to R15.

In Step S207, the second pattern detector 234 determines whether the selected pattern matches the second pattern P2 by comparing the characteristic information of the selected pattern with the characteristic information of the second pattern P2. In this example, the characteristic information of the second pattern P2 is stored for each one of the absolute angles obtainable from the second pattern P2. As described above referring to FIG. 15, the number of absolute angles is determined based on the unit angle u1. If the unit angle u1 is determined to be 60 degrees, the characteristic information of the second pattern P2 is stored for each one of the six absolute angles R20, R21, R22, R23, R24, and R25 as shown in FIG. 17. If the characteristic information of the selected pattern is substantially similar to the characteristic information of the second pattern P2 having at least one of the absolute angles R20 to R25 ("YES" in Step S207), the operation proceeds to Step S208. If the characteristic information of the selected pattern is not similar to the characteristic information of the second pattern P2 having at least one of the absolute angles R20 to R25 ("NO" in Step S207), the operation proceeds to Step S210.

In Step S208, the second angle detector 236 obtains the absolute angle of the selected pattern, i.e., the second pattern P2, in a substantially similar manner as described above referring to Step S205.

In Step S209, the second angle detector 236 increases, by one, a detected number of the second pattern P2 for the absolute angle obtained in the previous step. In this manner, the detected number of the second pattern P2 is obtained for each one of the absolute angles R20 to R25.

In Step S210, the pattern extractor 231 determines whether all unit areas of the binary image are processed. If all unit areas have been processed ("YES" in Step S210), the operation proceeds to Step S211 of FIG. 25B. If all unit areas have not been processed ("NO" in Step S210), the operation returns to Step S203 to select another unit area to determine whether the selected pattern matches either one of the first pattern P1 and the pattern P2.

Referring to FIG. 25B, in Step S211, the first angle detector 235 determines whether the peak is detected among the detected numbers that are obtained in Step S206 for each one of the absolute angles of the first pattern P1. In this example, the peak refers to the highest detected number, and a peak angle refers to the absolute angle having the highest detected number. If the peak is detected ("YES" in Step S211), the operation proceeds to Step S212 to determine that the peak angle is detected for the first pattern P1, and output information regarding the peak angle to the relative angle obtainer 237 of FIG. 24. If the peak is not detected ("NO" in Step S211), the operation ends to send an error message indicating that the angle of the first pattern P1 is undetectable.

In Step S213, the second angle detector 236 determines whether the peak is detected among the detected numbers that are obtained in Step S209 for each one of the absolute angles of the second pattern P2, in a substantially similar manner as described referring to Step S211. If the peak is detected ("YES" in Step S213), the operation proceeds to Step S214 to determine that the peak angle is detected for the second pattern P2, and output information regarding the peak angle to the relative angle obtainer 237 of FIG. 24. If the peak is not detected ("NO" in Step S213), the operation ends to send an error message indicating that the angle of the second pattern P2 is undetectable.

In Step S215, the relative angle obtainer 237 analyzes the peak angle ("the first peak angle") of the first pattern P1 and the peak angle ("the second peak angle") of the second pattern P2 to obtain a relative angle between the first pattern P1 and the second pattern P2. The relative angle can be obtained by calculating the difference between the first peak angle and the second peak angle.

In Step S216, the embedded data obtainer 24 of FIG. 24 obtains the embedded data of the processed image D1. In one example, the embedded data obtainer 24 converts the relative angle into the decimal character of the embedded data. In another example, the embedded data obtainer 24 converts any one of the first peak angle and the second peak angle into the decimal character of the embedded data.

For example, the relative angle Rr of the first pattern P1 and the second pattern P2 may be obtained using the following equation:

Rr=|Ra1−Ra2|Mod360/u2, wherein Ra1 corresponds to the absolute angle of the first pattern obtainable from the first peak angle, Ra2 corresponds to the absolute angle of the second pattern obtainable from the second peak angle, and u2 corresponds to the unit angle used for extracting. In this example, the Mod360/u2 corresponds to the remainder obtained by dividing 360 degrees by the unit angle u2 degrees. Further, in this example, the unit angle u2 for extracting is set to be equal to the unit angle u1 for embedding.

The operation shown in FIGS. 25A and 25B may be performed in various other ways as described above referring to FIGS. 23A and 23B.

Further, the original image input 21 may not determine whether the processed image D1 is in the upright position, if the embedded data can be obtained only from the relative angle of the plurality of patterns. In such case, the absolute angle of the first pattern P1 or the second pattern P2 may not be obtained.

Furthermore, Steps S203 to S215 of detecting the relative angle of the first pattern P1 and the second pattern P2 may be performed in various other ways. For example, the unit angle u1 or the quantization number q, which may be used for detecting the relative angle may be previously determined based on various parameters.

As described above referring to FIG. 26, any one of the detected absolute angle or the detected relative angle of the plurality of patterns may be classified into one of the ranges determined by the unit angle u1, each range corresponding to each level of the absolute angles determined during the embedding process. However, the detected absolute angle or the detected relative angle (collectively, referred to as "the detected angle") may not be extracted with high accuracy due to various factors. In one example, the original image may be distorted during scanning due to the scanner capacity. In another example, the original document may be distorted during printing due to the printer capacity. Accordingly, the absolute angle or the relative angle may not be obtained with high accuracy.

Figure 27:
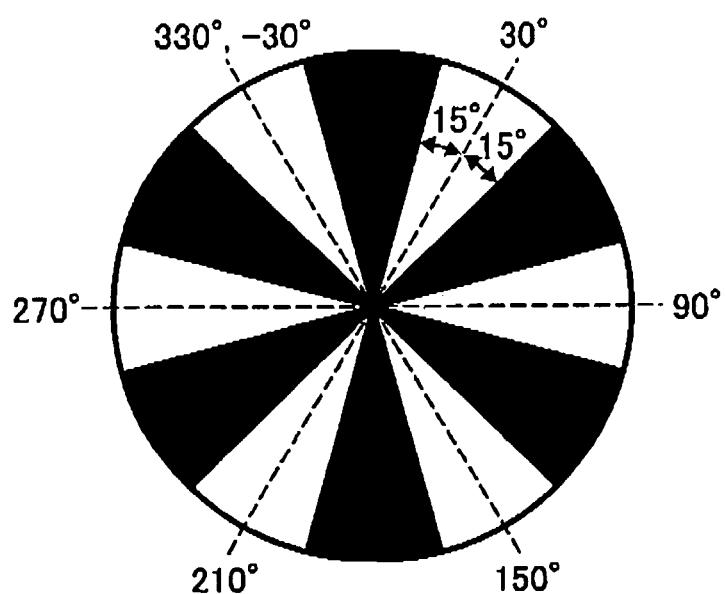
FIG. 27 is an illustration for explaining operation of obtaining an angle of a plurality of patterns according to an example embodiment of the present invention.

For example, as illustrated in FIG. 27, if the value of the detected angle fluctuates in the range of 30 degrees from −15 degrees to +15 degrees, the value of the detected angle can be used for further processing only when the value falls in the range indicated by the black color. The value of the detected angle may not be accurately extracted when the value falls in the range indicated by the white color. As shown in FIG. 27, the black color range has the amount of degrees substantially equal to the amount of degrees of the white color range. This indicates that the probability of accurately extracting the detected angle is 50 percent. This probability may be further reduced when the fluctuation range of the detected angle increases.

Specifically, when the first pattern P1 has the absolute angle R10 of FIG. 16 and the second pattern P2 has the absolute angle R22 of FIG. 17, the relative angle of the first pattern P1 and the second pattern P2 is presumed to be equal to the relative angle R2 as shown in FIG. 26. However, if the detected absolute angle of the first pattern P1 fluctuates in the range of 30 degrees, the detected absolute angle of the first pattern P1 may be inaccurately determined to be the absolute angle R11 when the detected absolute angle falls in the black color range. Similarly, if the detected absolute angle of the second pattern P2 fluctuates in the range of 30 degrees, the detected absolute angle of the second pattern P2 may be inaccurately determined to be the absolute angle R23 when the detected absolute angle falls in the black color range. As a result, the relative angle of the first pattern P1 and the second pattern P2 may vary from R1 to R3.

Figure 28:
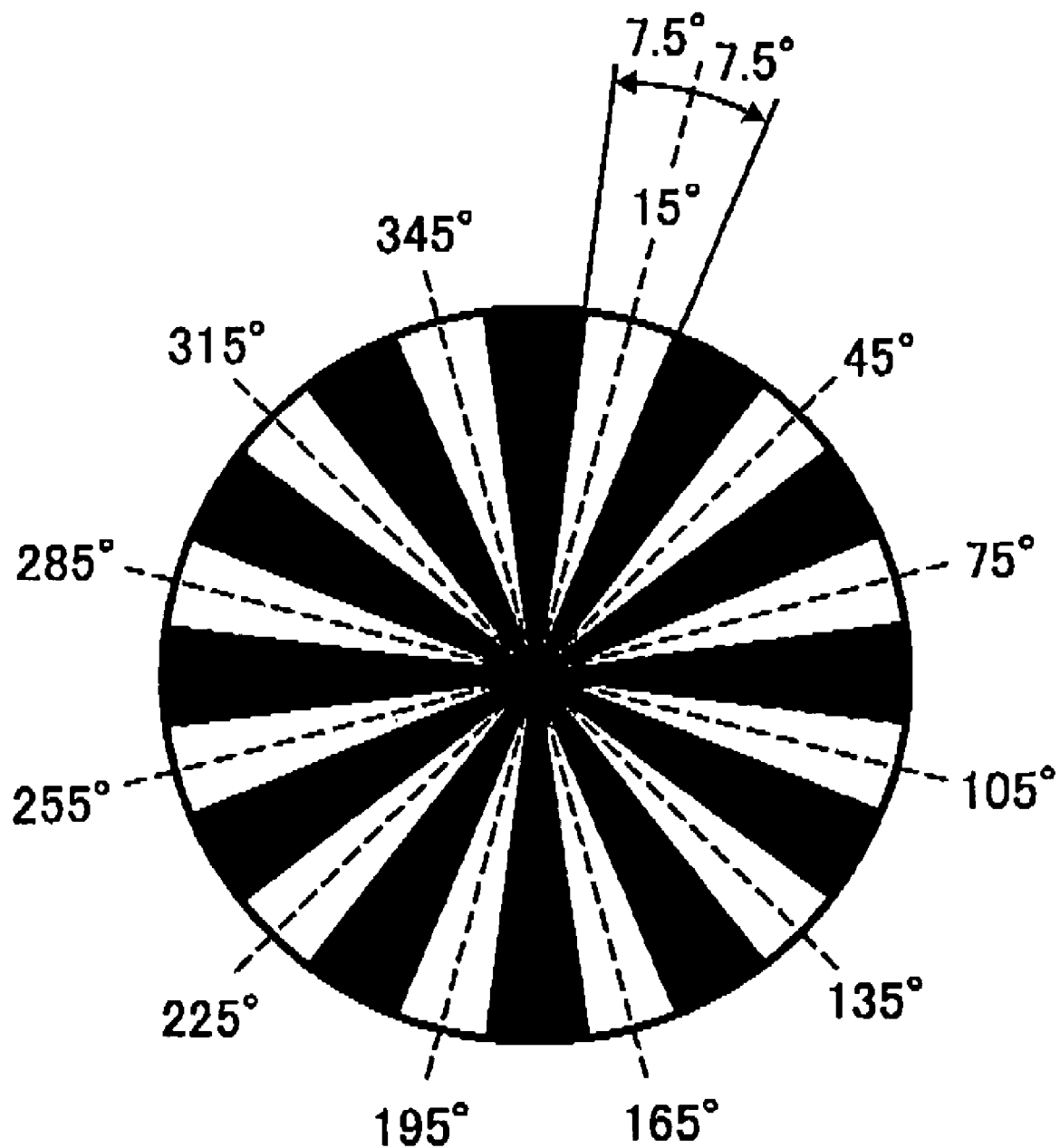
FIG. 28 is an illustration for explaining operation of obtaining an angle of a plurality of patterns according to an example embodiment of the present invention.

FIG. 28 illustrates another example case in which the unit angle is set to be 30 degrees. Accordingly, the continuous range of angle is divided into twelve levels of absolute angles. Further, in this example, the value of the detected angle fluctuates in the range of 15 degrees from −7.5 degrees to +7.5 degrees. In such case, the value of the detected angle can be used for further processing only when the value falls in the range indicated by the black color. From the comparison between the black color range and the white color range, the probability of accurately extracting the detected angle is determined to be 50 percent.

In order to reduce the detection error described referring to FIG. 27 or 28, for example, any one of the unit angle u1 for embedding, the quantization number q, a unit angle u2 for extracting, the range used for extracting may be specified.

More specifically, in one example, the value of unit angle u2 for extracting is specified to be equal to or greater than twice the fluctuation range f of the detected angle (referred to as the "rule 1"), as indicated by the following equation:

$$u2 \geq 2*f.$$

The fluctuation range of detected angle can be obtained by the empirical rule using a scanner or a printer, for example.

In another example, the value of unit angle u2 for extracting is specified to be equal to half of the value of unit angle u1 for embedding (referred to as the "rule 2") as expressed by the following equation:

$$u2 = 1/2*u1.$$

Alternatively, the rule 2 may be described as the situation in which the unit angle u1 for embedding is specified to be equal to twice the value of unit angle u2 for extracting.

Referring now to FIGS. 29 to 32, operation of determining the unit angle u1 for embedding is explained according to an example embodiment of the present invention. In this example, the detected angle is presumed to fluctuate in the range of 30 degrees from −15 degrees to +15 degrees.

According to the first rule, the unit angle u2 for extracting is determined to be 60 degrees. Further, the unit angle u1 for embedding is determined to be 120 degrees according to the second rule. Since the quantization number q is three, a plurality of patterns each having three absolute angles may be obtained during the embedding process. Further, the number of relative angles is limited to three. In the examples described below, the plurality of patterns can be classified into a third pattern P3 and a fourth pattern P4.

Figure 29:
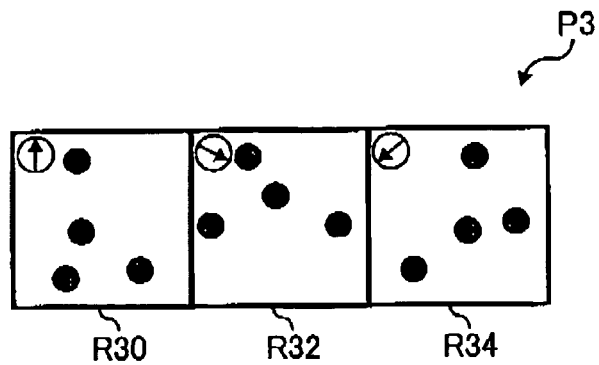
FIG. 29 is an illustration of a plurality of third patterns each having a different absolute angle according to an example embodiment of the present invention.
Figure 30:
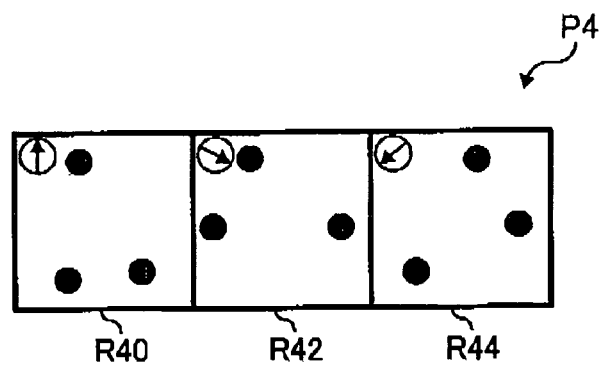
FIG. 30 is an illustration of a plurality of fourth patterns each having a different absolute angle according to an example embodiment of the present invention.

In one example, as illustrated in FIG. 29, the third pattern P3 may have the absolute angle R30 corresponding to the upright position of the third pattern P3; the absolute angle R32 corresponding to the orientation rotated by one unit angle, i.e., 120 degrees from the upright position; and the absolute angle R34 corresponding to the orientation rotated by two unit angles, i.e., 240 degrees from the upright position. At least one of the absolute angles R30, R32 and R34 may be selected when embedding the third pattern P3, for example, depending on the information contained in the embedded data. Similarly, as illustrated in FIG. 30, the fourth pattern P4 may have the absolute angle R40 corresponding to the upright position; the absolute angle R42 corresponding to the orientation rotated by one unit angle, i.e., 120 degrees from the upright position; and the absolute angle R44 corresponding to the orientation rotated by two unit angles, i.e., 240 degrees from the upright position. At least one of the absolute angles R40, R42 and R44 may be selected when embedding the fourth pattern P4, for example, depending on the information contained in the embedded data. Using any combination of the third pattern P3 and the fourth pattern P4, the relative angle may be determined to be at least one of the relative angle R1 corresponding to 0 degree, the relative angle R2 corresponding to 120 degrees, and the relative angle R3 corresponding to 240 degrees.

Figure 31:
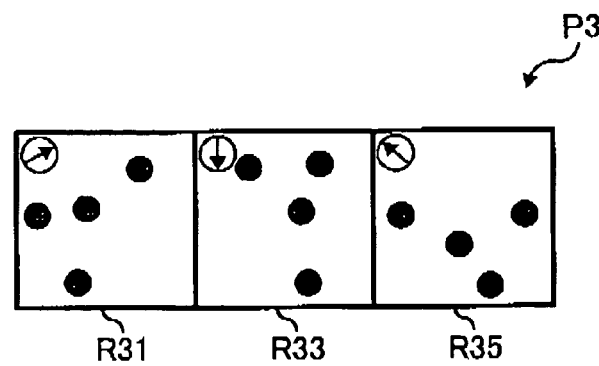
FIG. 31 is an illustration of a plurality of third patterns each having a different absolute angle according to an example embodiment of the present invention.
Figure 32:
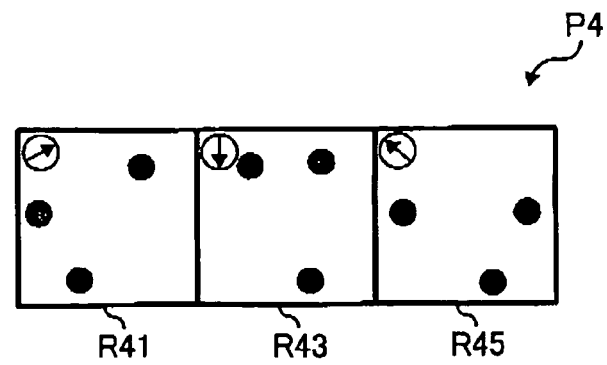
FIG. 32 is an illustration of a plurality of fourth patterns each having a different absolute angle according to an example embodiment of the present invention.

In another example, as illustrated in FIG. 31, the third pattern P3 may have the absolute angle R31 corresponding to the orientation rotated by 60 degrees from the upright position; the absolute angle R33 corresponding to the orientation rotated by one unit angle, i.e., 120 degrees from the absolute angle R31; and the absolute angle R35 corresponding to the orientation rotated by two unit angles, i.e., 240 degrees from the absolute angle R31. At least one of the absolute angles R31, R33 and R35 may be selected when embedding the third pattern P3, for example, depending on the information contained in the embedded data. Similarly, as illustrated in FIG. 32, the fourth pattern P4 may have the absolute angle R41 corresponding to the orientation rotated by 60 degrees from the upright position; the absolute angle R43 corresponding to the orientation rotated by one unit angle, i.e., 120 degrees from the absolute angle R41; and the absolute angle R45 corresponding to the orientation rotated by two unit angles, i.e., 240 degrees from the absolute angle R41. At least one of the absolute angles R41, R43 and R45 may be selected when embedding the fourth pattern P4, for example, depending on the information contained in the embedded data. Using any combination of the third pattern P3 and the fourth pattern P4, the relative angle may be determined to be at least one of the relative angle R1 corresponding to 0 degree, the relative angle R2 corresponding to 120 degrees, and the relative angle R3 corresponding to 240 degrees.

Figure 33:
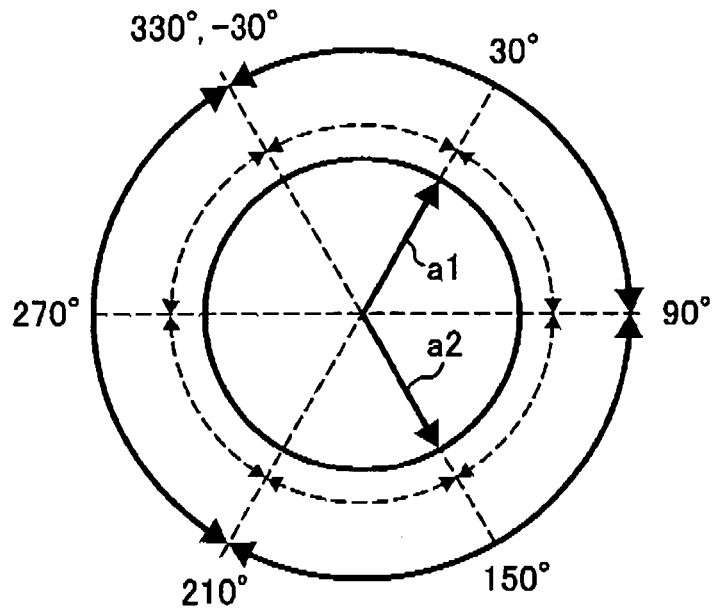
FIG. 33 is an illustration for explaining operation of obtaining an angle of a plurality of patterns according to an example embodiment of the present invention.
Figure 34:
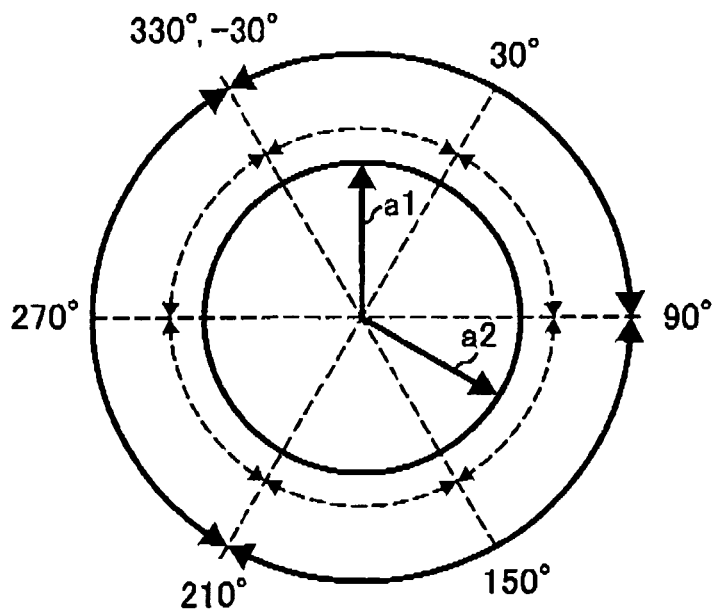
FIG. 34 is an illustration for explaining operation of obtaining an angle of a plurality of patterns according to an example embodiment of the present invention.
Figure 35:
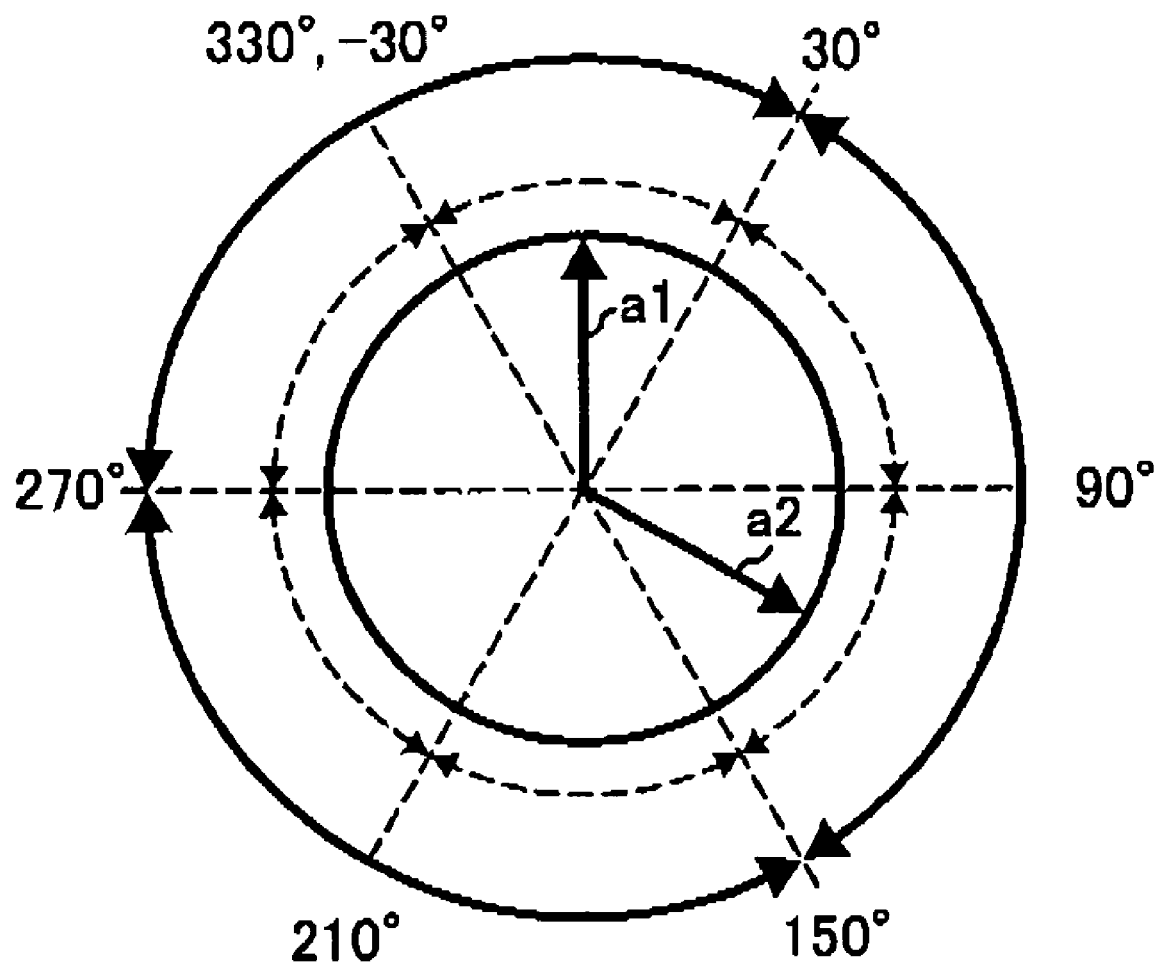
FIG. 35 is an illustration for explaining operation of obtaining an angle of a plurality of patterns according to an example embodiment of the present invention.

Referring now to FIGS. 33 to 35, operation of determining the unit angle u2 for extracting is explained according to an example embodiment of the present invention. For the illustrative purpose, an original image is presumed to be embedded with the third pattern P3 having the absolute angle R30 and the fourth pattern P4 having the absolute angle R42. Accordingly, the relative angle of the third pattern P3 and the fourth pattern P4 is presumed to be R2, i.e., 120 degrees. Further, in this example, the fluctuation range of detected angle is set to be equal to 30 degrees.

According to the first rule, the unit angle u2 for extracting is determined to be equal to or greater than 60 degrees. Thus, the continuous angle of degree is divided by 60 degrees to obtain six ranges as illustrated in FIG. 26. The detected angle can be then classified into one of the six ranges in a substantially similar manner as described above referring to FIG. 26.

However, since the fluctuation range of the detected angle is 30 degrees, as illustrated in FIG. 33, the absolute angle R30 of 0 degree may be inaccurately detected as the detected absolute angle of 30 degrees (indicated by a1), and the absolute angle R42 of 120 degrees may be inaccurately detected as the detected absolute angle of 150 degrees (indicated by a2). In such case, the absolute angle R30 or the absolute angle R42 may not be accurately detected. As a result, the relative angle of the third pattern P3 and the fourth pattern P4 may not be accurately detected.

To reduce the detection error, the number of ranges that has been generated based on the unit angle u2 for extracting may be reduced by combining two ranges that ate adjacent from each other into one range. In one example, the combination of two ranges may be determined based on the detected angle. For example, as illustrated in any one of FIGS. 33 and 34, a first range to which the detected angle belongs, and a second range adjacent to the first range, may be combined into one range. Alternatively, the combination of two ranges may be previously defined by default, for example, as illustrated in FIG. 35. Alternatively, the combination of two ranges may be determined based on the angle information indicating the absolute or relative angles of the plurality of patterns.

Referring to FIG. 33 or 34, the range from −30 degrees to 30 degrees and the range from 30 degrees to 90 degrees are combined into one range from −30 degrees to 90 degrees. The range from 90 degrees to 150 degrees and the range from 150 degrees to 210 degrees are combined into one range from 90 degrees to 210 degrees. The range from 210 degrees to 270 degrees and the range from 270 degrees to 330 degrees are combined into one range from 210 degrees to 330 degrees.

Referring to FIG. 35, the range from 30 degrees to 90 degrees and the range from 90 degrees to 150 degrees are combined into the range from 30 degrees to 150 degrees. The range from 150 degrees to 210 degrees and the range from 210 degrees to 270 degrees are combined into the range from 150 degrees to 270 degrees. The range from 270 degrees to 330 degrees and the range from −30 degrees to 30 degrees are combined into the range from 270 degrees to 30 degrees.

Using the ranges obtained by combining, the absolute angle or relative angle of the plurality of patterns can be obtained with high accuracy.

Referring back to FIG. 33, since the detected absolute angle of 30 degrees falls in the range from −30 degrees to 90 degrees, the detected absolute angle is determined to be the absolute angle R30 of 0 degree. Similarly, since the detected absolute angle of 150 degrees falls in the range from 90 degrees to 210 degrees, the detected absolute angle is determined to be the absolute angle R42 of 120 degrees. Further, the relative angle of the third pattern P3 and the fourth pattern P4 is determined to be R1.

Referring back to FIG. 34 or 35, the absolute angle R30 of 0 degree is accurately detected (indicated by a1), and the absolute angle R42 of 120 degrees is accurately detected. In a substantially similar manner as described referring to FIG. 33, the absolute angles of the third pattern P3 and the fourth pattern P4 can be respectively extracted with high accuracy. Further, the relative angle of the third pattern P3 and the fourth pattern P4 can be accurately extracted.

If more than one range that is determined by the unit angle u2 for extracting are combined during the extracting process, the value of unit angle u2 for extracting may not be necessarily equal to or greater than twice the fluctuation range of the detected angle, as the rule 1 states. More specifically, the value of unit angle u2 for extracting can be specified to be greater than the fluctuation range f of the detected angle (referred to as the "rule 3"), as expressed by the following equation:

$$u2>f.$$

If the rule 3 is applied together with the rule 2, the unit angle u2 for extracting can be set to be substantially equal to 30 degrees, when the fluctuation range of the detected angle is 30 degrees. Further, the unit angle u1 for embedding can be set to 60 degrees. If the rule 3 is applied instead of the rule 1, the amount of information that can be embedded as the embedded data may increase.

Alternatively, the unit angle u2 for extracting may be further broken down into one or more minimum unit angles s. The minimum unit angle s corresponds to the unit angle having the minimum value obtainable by quantizing the continuous range of angle. Since the range can be broken down into one or more unit angles u2 and each one of the unit angles u2 can be broken down into one or more minimum unit angles s, the range can be broken down into one or more minimum unit angles s. Thus, the rule 3 may be applied by obtaining the smallest value of the number x of minimum unit angles s that can satisfy the equation:

$$f<s*x,$$ wherein f corresponds to the fluctuation range of the detected angle expressed in degree, s corresponds to the value of minimum unit angle expressed in degree, and x corresponds to the number of minimum unit angles expressed in integer. Further, the value of unit angle for extracting corresponds to the value $s*x$.

Further, the rule 2 may be applied by obtaining the largest value of the quantization number q that can satisfy the equation:

$$s*x*2q \leq 360,$$ wherein the value of unit angle u1 for embedding corresponds to the value $360/q$.

Further, the absolute angle or the relative angle can be expressed as a set of $\{s*x*2*0, s*x*2*1, \ldots, s*x*2*(q-1)\}$.

Figure 36A:
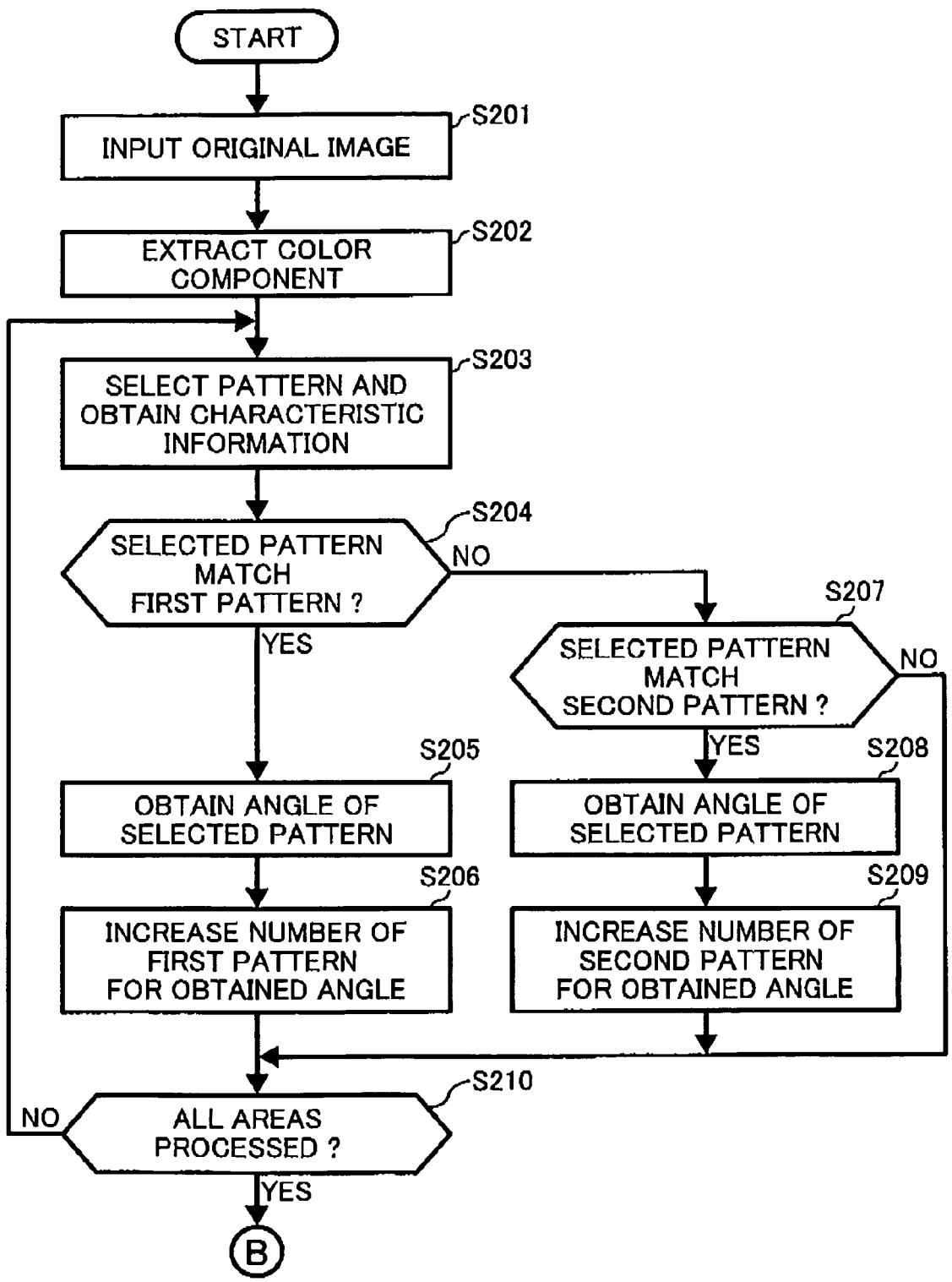
FIGS. 36A and 36B are flowcharts illustrating operation of obtaining embedded data from an original image, preformed by the extracting apparatus of FIG. 21, according to an example embodiment of the present invention.
Figure 36B:
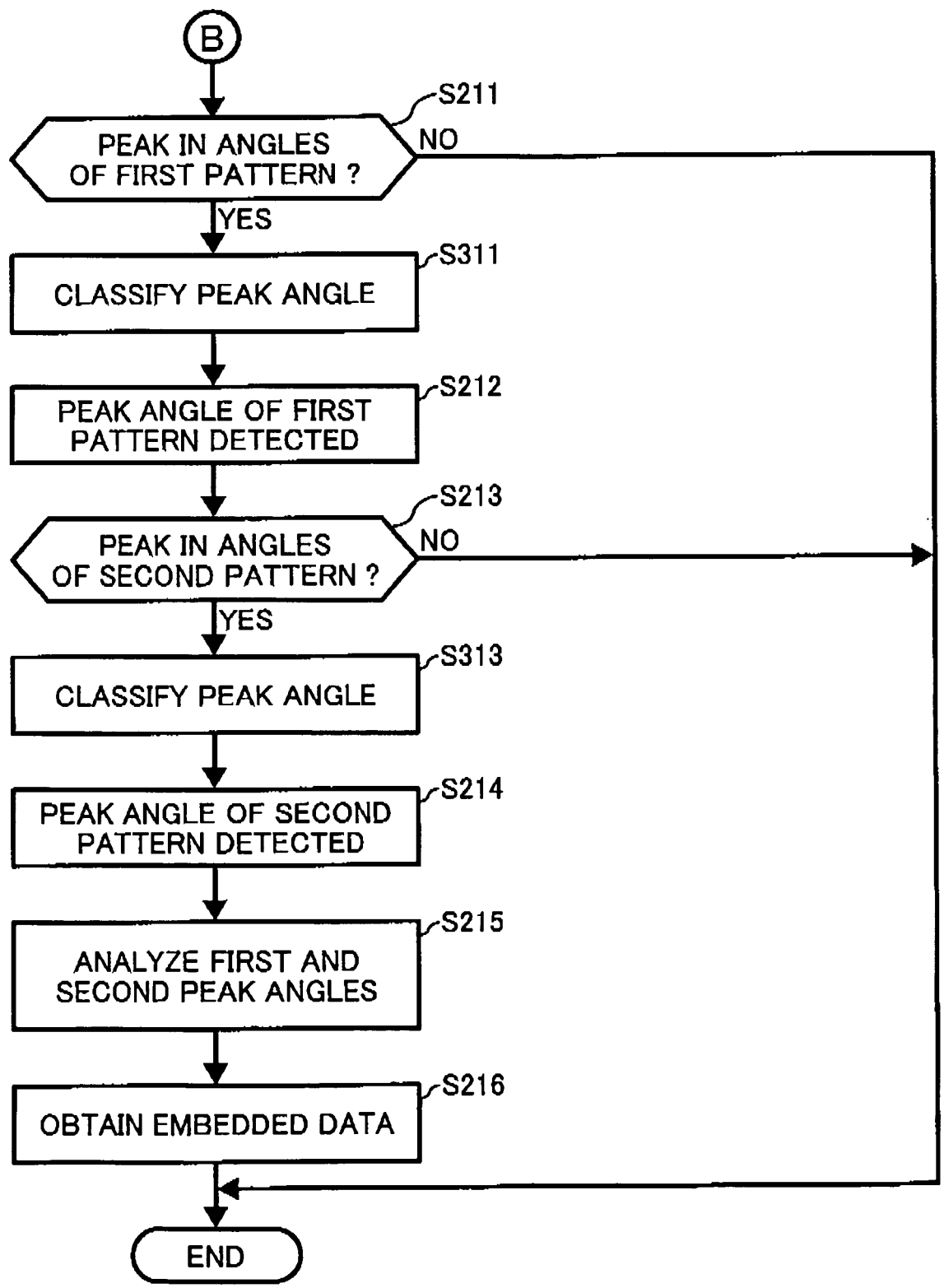

Referring now to FIGS. 36A and 36B, operation of obtaining embedded data from an original image, performed by the extracting apparatus of FIG. 21, is explained according to an example embodiment of the present invention. The operation of FIGS. 36A and 36B is substantially similar to the operation of FIGS. 25A and 25B. The differences include the addition of Step S311 and Step S313 shown in FIG. 36B.

Referring to FIG. 36B, in Step S311, the first angle detector 235 determines the classification of the first peak angle, using any one of the above-described rules. In one example, the six ranges shown in FIG. 26 may be reclassified into three ranges as described above referring to any one of FIGS. 33 to 35. According to these three ranges, the detected numbers obtained for the six angles are converted to the detected numbers for the three angles. From the converted detected numbers, the peak angle having the highest detected number is obtained for further processing.

Similarly, in Step S313, the second angle detector 236 determines the classification of the second peak angle, using any one of the above-described rules, in a substantially similar manner as described referring to Step S311.

Figure 37:
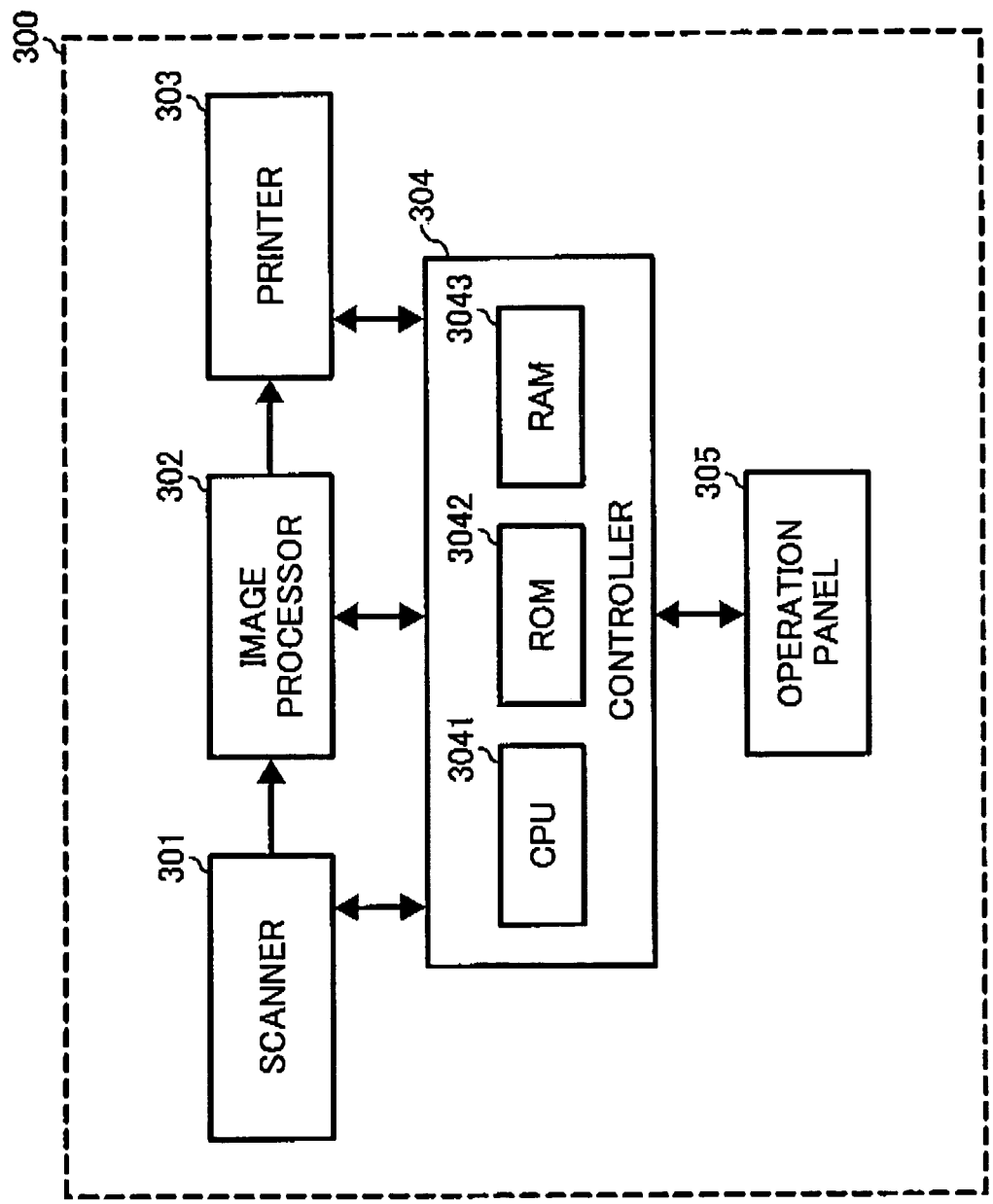
FIG. 37 is a schematic block diagram illustrating the structure of an image forming apparatus according to an example embodiment of the present invention.
Figure 39:
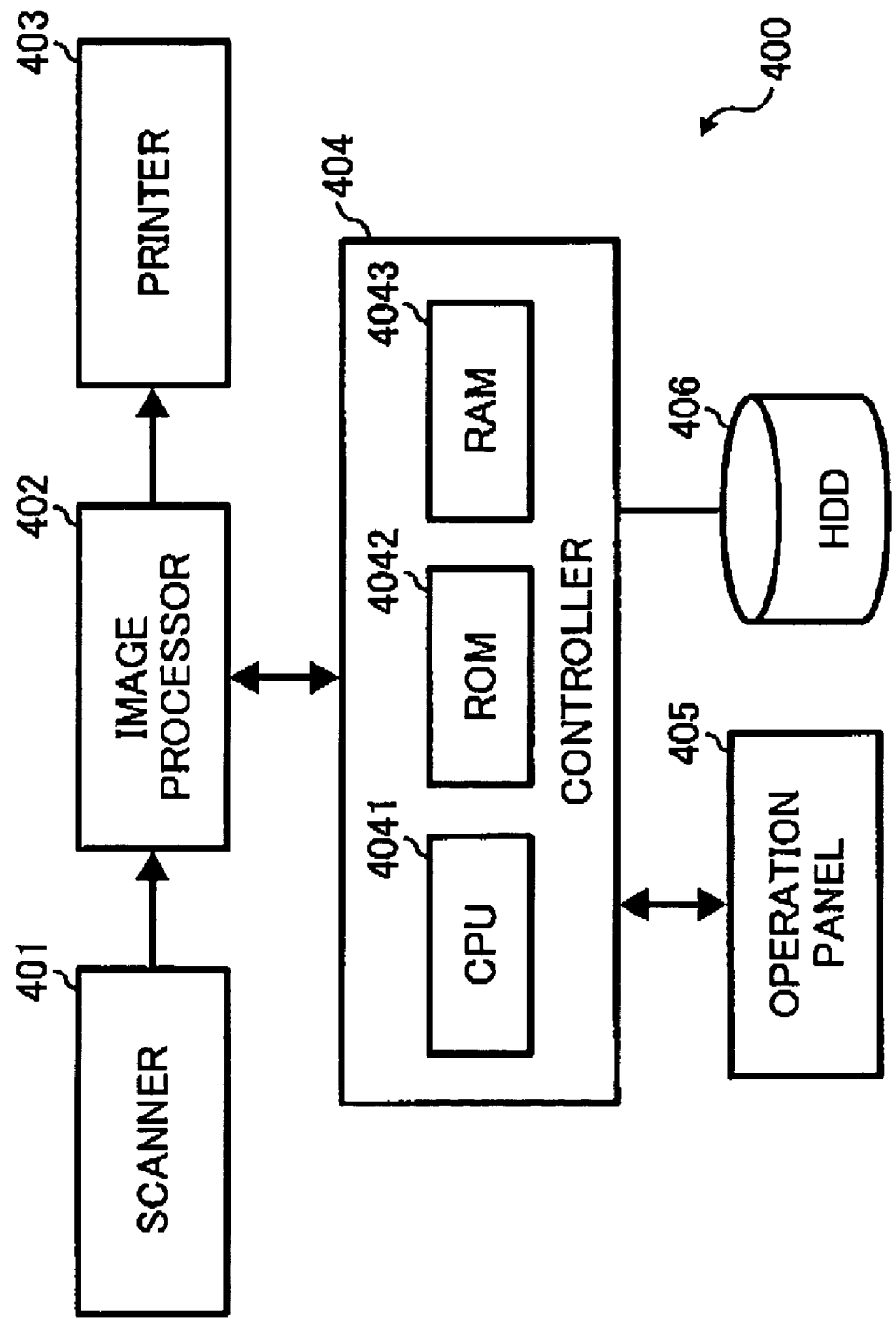
FIG. 39 is a schematic block diagram illustrating the structure of an image forming system according to an example embodiment of the present invention.
Figure 40:
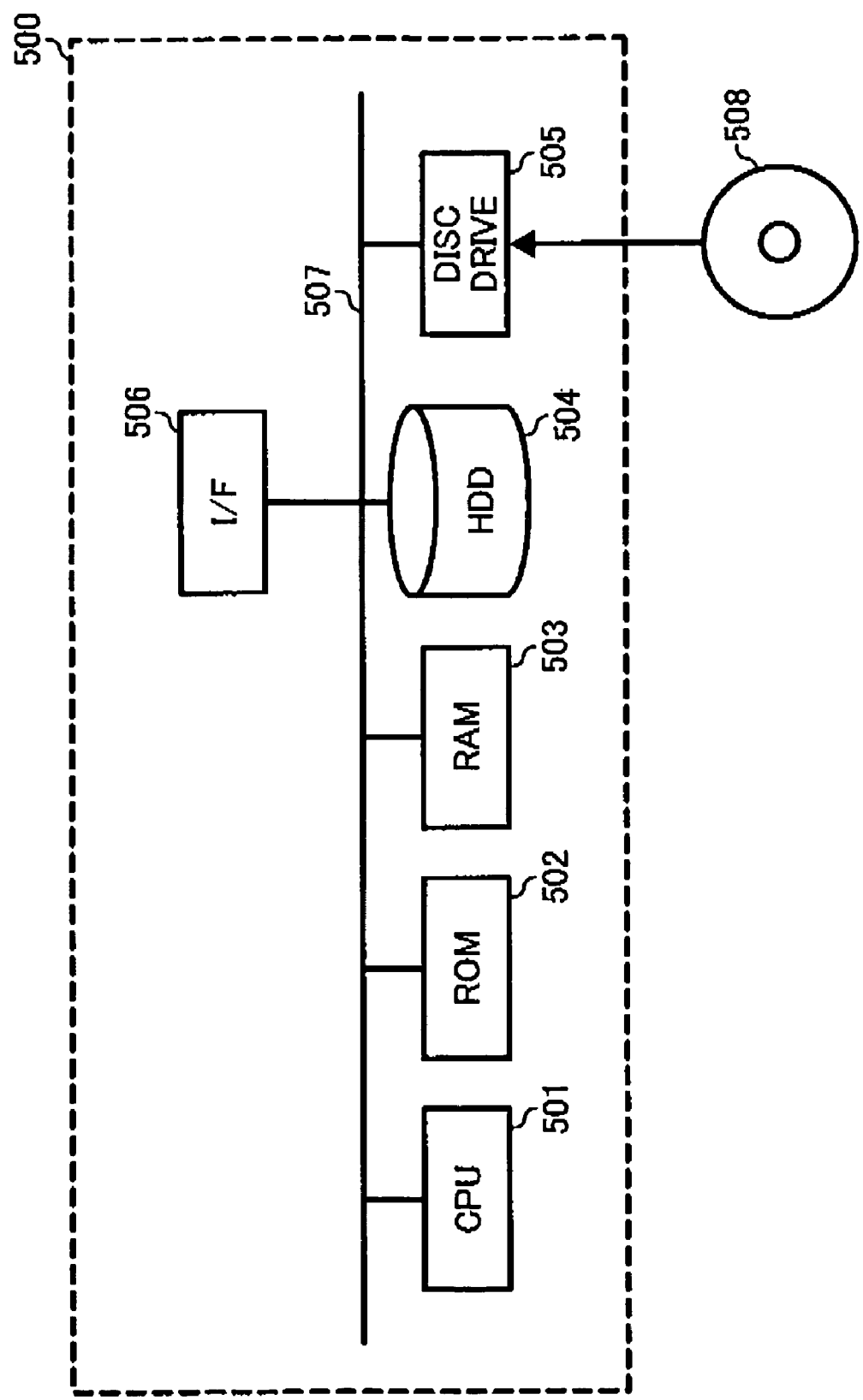
FIG. 40 is a schematic block diagram illustrating the structure of an image processing apparatus according to an example embodiment of the present invention.

Any one of the above-described embedding apparatus 10 of FIG. 1, the extracting apparatus 20 of FIG. 21, and other example embodiments of the present invention may be implemented in various ways, for example, as an image forming apparatus 300 shown in FIG. 37, an image forming system 400 shown in FIG. 39, or an image processing apparatus shown in FIG. 40.

The image forming apparatus 300 of FIG. 37 may be implemented by a multifunctional apparatus capable of performing a plurality of functions including the functions of scanning, printing, copying, etc. The image forming apparatus 300 includes a scanner 301, image processor 302, printer 303, controller 304, and operation panel 305.

The scanner 301 includes any kind of device capable of reading an original document into an original image to be processed. The image processor 302 includes any kind of device capable of applying various image processing to the original image. The printer 303 includes any kind of device capable of outputting the original image, such as a printer or a plotter. The operation panel 305 functions as a user interface. In this example, the operation panel 305 at least includes an input device allowing a user to input data such as a plurality of keys, and a display device displaying data to the user such as a liquid crystal display. The controller 304 controls at least one of the scanner 301, image processor 302, and printer 303 according to an instruction received from the operation panel 205. As shown in FIG. 37, the controller 304 includes a central processing unit (CPU) 3041, read only memory (ROM) 3042, and random access memory (RAM) 3043.

Figure 38:
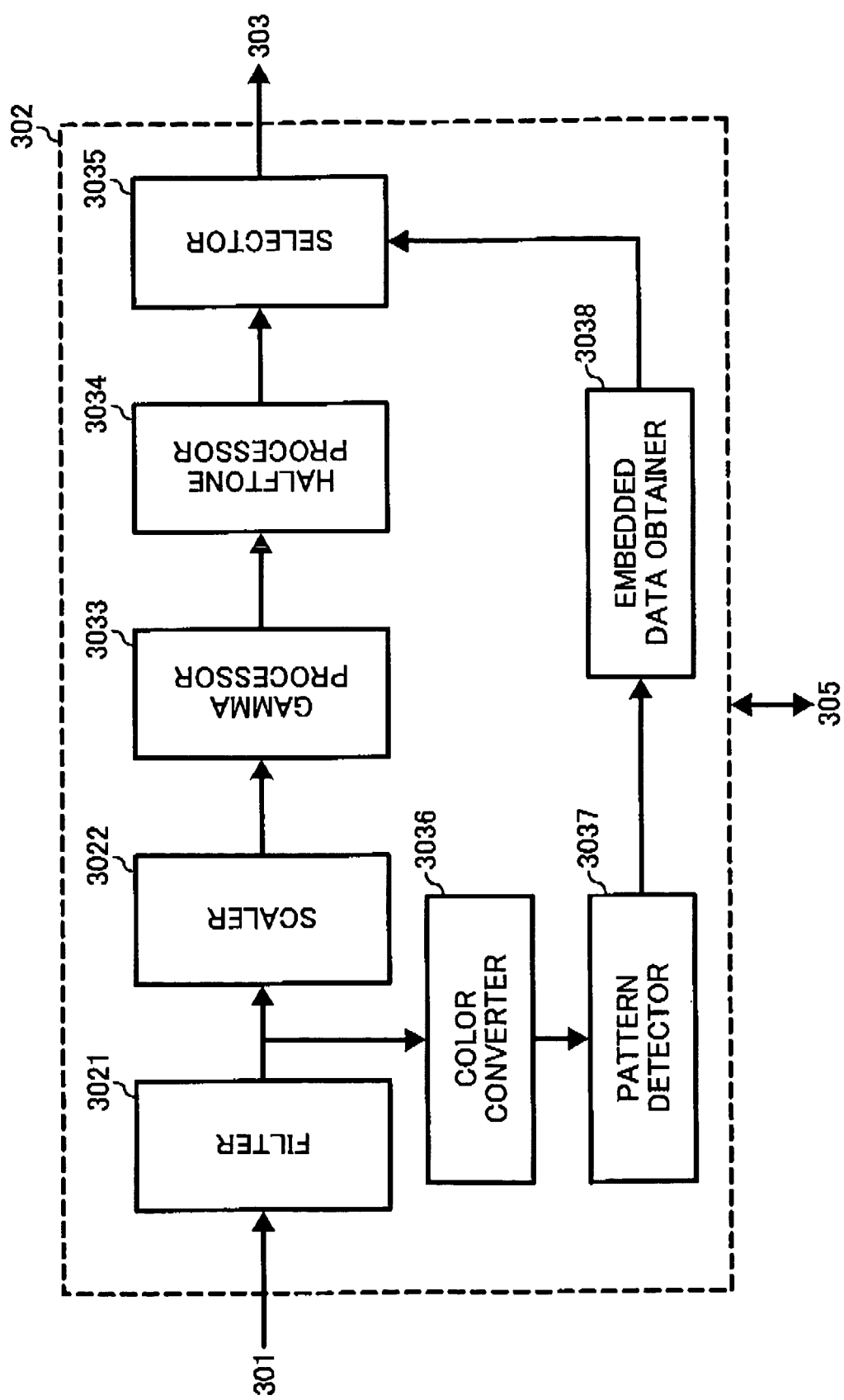
FIG. 38 is a schematic block diagram illustrating the structure of an image processor shown in FIG. 37 according to an example embodiment of the present invention.

In one example, the image forming apparatus 300 may function as the extracting apparatus 20 of FIG. 21. In such case, the image processor 302 may have the structure shown in FIG. 38. Referring to FIG. 38, the image processor 302 includes a filter 3021, scaler 3022, gamma processor 3033, halftone processor 3034, selector 3035, color converter 3036, pattern detector 3037, and an embedded data obtainer 3038. In this example, the controller 304 of FIG. 37 is incorporated into the image processor 302.

In one example operation, the scanner 301 may function as the original image input 21 of FIG. 21. For example, the scanner 301 reads an original document into an original image to be processed, according to an instruction received from the user via the operation panel 305.

The filter 3021 may apply preprocessing to the original image before providing the original image to the color converter 3036. The color converter 3036 may function as the color detector 22 of FIG. 21, which converts the original image into a binary image using one or more color components. The pattern detector 3037 may function as the pattern detector 23 of FIG. 21, which detects a plurality of patterns from the original image or the binary image. The embedded data obtainer 3038 may function as the embedded data obtainer 24 of FIG. 21, which converts the plurality of patterns into embedded data. The embedded data is output to the selector 3035. Based on the embedded data, the selector 3035 controls operation of the printer 303. Any one of the scaler 3022, gamma processor 3033, and halftone processor 3034 may apply to various image processing to the original image.

The printer 303 operates according to an instruction received from the selector 3035. In one example, when the embedded data is not obtained by the selector 3035, the printer 303 is caused to print out the original image as the printed original document. In another example, when the embedded data is obtained by the selector 3035, the printer 303 is caused to cancel printing of the original image. In another example, when the embedded data is obtained by the selector 3035, the printer 303 is caused to conceal the information contained in the original image, for example, by making the plurality of patterns visible to the user. In another example, when the embedded data is obtained by the selector 3035, the printer 303 is caused to notify the user that the original image is copy guarded, for example, by making a pattern or a mark visible to the user.

In another example operation, the image forming apparatus 300 may function as the embedding apparatus 10 of FIG. 1. In such case, the structure of the image processor 302 may differ from the structure shown in FIG. 38. For example, the pattern detector 3037 and the embedded data obtainer 3038 may not be provided. Further, a pattern determinator functioning as the pattern determinator 13 of FIG. 1, and a pattern embedder functioning as the pattern embedder 14 of FIG. 1 may be additionally provided.

In one example operation, the scanner 301 may function as the original image input 11 of FIG. 1. For example, the scanner 301 reads an original document into an original image to be processed, according to an instruction received from the user via the operation panel 305.

The operation panel 305 may function as the embedded data obtainer 12 by allowing the user to input embedded data or any parameters regarding the embedded data. Alternatively, the memory incorporated in the image processor 302, such as the ROM 3042, may function as the embedded data obtainer 12 by storing information regarding the embedded data. Additionally, a storage device such as a hard disk drive (HDD) may be provided.

The printer 303 may function as the processed image output 15, which outputs the processed image as a printed document. Alternatively, the operation panel 305 may function as the processed image by displaying the processed image using the display device.

Referring to FIG. 39, the image forming system 400 includes a scanner 401, image processor 402, printer 403, controller 404, operation panel 405, and HDD 406.

The scanner 401 includes any kind of device capable of reading an original document into an original image to be processed. The image processor 402 includes any kind of device capable of applying various image processing to the original image. The printer 403 includes any kind of device capable of outputting the original image, such as a printer or a plotter. The controller 404 controls operation of the image forming system 400, The operation panel 305 functions as a user interface. The HDD 406 includes any kind of storage capable of storing a large amount of data.

In example operation, the HDD 406 may store an image processing program of the present invention. Upon execution, the CPU 4041 loads the image processing program onto a ROM 4042, and causes the image forming system 400 to function as the embedding apparatus 10 of FIG. 1 or the extracting apparatus 20 of FIG. 21.

Referring to FIG. 40, the image processing apparatus 500 includes a CPU 501, ROM 502, RAM 503, hard disk drive (HDD) 504, disc drive 505, and an interface (I/F) 506, which are connected via a bus 507. The image processing apparatus 500 may be implemented by a personal computer, for example.

The CPU 501 includes any kind of processor capable of controlling operation of the image processing apparatus 500, The ROM 502 includes any kind of involatile memory, such as BIOS, for example. The RAM 503 functions as a work memory for the CPU 501. The HDD 504 includes any kind of storage capable of storing a large amount of data. The disc drive 505 includes any kind of device capable of reading data from a removable disc 508. The I/F 506 includes any kind of device capable of functioning as a user interface, such as an input device including a mouse or a keyboard, a display device, etc. The I/F 506 may further function as a network interface, which connects the image processing apparatus 500 to a network such as a local area network (LAN) or the Internet.

In one example operation, the image processing program of the present invention may be installed on the HDD 204 from the removable disc 508 storing the image processing program. The image processing program may be further loaded onto the ROM 502 upon activation of the CPU 501.

In another example, the image processing program may be downloaded from any other device or apparatus via the network, through the interface 506. Further, the image processing program may be uploaded from the image processing apparatus 500 to any other device or apparatus through the network.

Numerous additional modifications and variations are possible in light of the above teachings. It is therefore to be understood that within the scope of the appended claims, the disclosure of this patent specification may be practiced in ways other than those specifically described herein.

For example, elements and/or features of different illustrative embodiments may be combined with each other and/or substituted for each other within the scope of this disclosure and appended claims.

Furthermore, as described above, any one of the above-described and other methods of the example embodiments of the present invention may be embodied in the form of a computer program stored in any kind of storage medium. Examples of storage mediums include, but are not limited to, flexible disk, hard disk, optical discs, magneto-optical discs, magnetic tapes, involatile memory cards, ROM (read-only-memory), etc.

Alternatively, any one of the above-described and other methods of the example embodiments of the present invention may be implemented by ASIC, prepared by interconnecting an appropriate network of conventional component circuits or by a combination thereof with one or more conventional general purpose microprocessors and/or signal processors programmed accordingly.

The invention claimed is:

1. An apparatus for embedding data to be embedded into an original image, the apparatus comprising:
   means for obtaining the data to be embedded, wherein the data is to be embedded into an embedded area of the original image in the form of a plurality of patterns;
   means for selecting, from a plurality of pattern types, at least two pattern types to be used for the plurality of patterns based on the data to be embedded;
   means for determining a relative relationship of the at least two pattern types of the plurality of patterns based on the data to be embedded, wherein the relative relationship is expressed by at least one of (1) absolute angles of the at least two pattern types of the plurality of patterns relative to the original image, and (2) a relative angle of the at least two pattern types of the plurality of patterns indicating the relationship of the absolute angles of the at least two pattern types of the plurality of patterns; and
   means for embedding the plurality of patterns having the relative relationship determined by the means for determining and having the at least two pattern types selected by the means for selecting to the embedded area of the original image.

2. The apparatus of claim 1, wherein the embedded data is configured to contain information that can be expressed by a predetermined number of digits.

3. The apparatus of claim 1, wherein the relative relationship of the plurality of patterns can further be expressed by an arrangement of the plurality of patterns in the embedded area.

4. The apparatus of claim 1, wherein the means for determining is configured to further determine colors of the plurality of patterns.

5. An apparatus for extracting embedded data from an original image, the apparatus comprising:
- means for obtaining the original image, wherein the original image is presumed to be embedded with embedded data;
- means for detecting a plurality of patterns having a relative relationship and having at least two pattern types in the original image, wherein the relative relationship is expressed by at least one of (1) absolute angles of the at least two pattern types of the plurality of patterns relative to the original image, and (2) a relative angle of the at least two pattern types of the plurality of patterns indicating the relationship of the absolute angles of the at least two pattern types of the plurality of patterns;
- means for detecting the at least two pattern types of the plurality of patterns based on characteristic information obtained from the plurality of patterns;
- means for detecting an angle of each one of the at least two pattern types of the plurality of patterns to obtain a detected angle;
- means for determining at least one of (1) the absolute angles of the at least two pattern types of the plurality of patterns, and (2) the relative angle of the at least two pattern types of the plurality of patterns; and
- means for analyzing the relative relationship of the plurality of patterns using the at least one of the absolute angles and the relative angle obtained by the means for determining to obtain the embedded data of the original image.

6. The apparatus of claim 5, wherein the characteristic information of the at least two pattern types of the plurality of patterns are partially identical from each other.

7. The apparatus of claim 5, wherein the means for determining comprises:
- means for determining whether the detected angle belongs to one of a plurality of ranges determined by a unit angle for extracting to obtain the range to which the detected angle belongs, the obtained range being used to determine the value of the at least one of the absolute angles and the relative angle,
- wherein the unit angle for extracting is determined to have the value determined based on the value of a unit angle for embedding, the unit angle for embedding being used for the process of embedding the embedded data having the relative relationship and the at least two pattern types.

8. The apparatus of claim 7, wherein the unit angle for extracting is equal to or less than half of the unit angle for embedding.

9. An image processing method, comprising using a processor to perform the steps of:
- obtaining data to be embedded into an original image, wherein the data is to be embedded in the form of a plurality of patterns;
- selecting, from a plurality of pattern types, at least two pattern types to be used for the plurality of patterns based on the data to be embedded;
- determining a relative relationship of the at least two pattern types of the plurality of patterns based on the data to be embedded, wherein the relative relationship is expressed by at least one of (1) absolute angles of the at least two pattern types of the plurality of patterns relative to the original image, and (2) a relative angle of the at least two pattern types of the plurality of patterns indicating the relationship of the absolute angles of the at least two pattern types of the plurality of patterns; and
- generating an embedded image by embedding the plurality of patterns, wherein the plurality of patterns has the relative relationship determined by the determining step and has the at least two pattern types selected by the selecting step.

10. The method of claim 9, further comprising the step of:
- combining the embedded image and the original image into a processed image.

11. An image processing method, comprising using a processor to perform the steps of:
- obtaining an original image, wherein the original image is presumed to be embedded with embedded data;
- detecting a plurality of patterns having a relative relationship and at least two pattern types in the original image, wherein the relative relationship is expressed by at least one of (1) absolute angles of the at least two pattern types of the plurality of patterns relative to the original image, and (2) a relative angle of the at least two pattern types of the plurality of patterns indicating the relationship of the absolute angles of the at least two pattern types of the plurality of patterns;
- detecting the at least two pattern types of the plurality of patterns based on characteristic information obtained from the plurality of patterns;
- detecting an angle of each one of the at least two pattern types of the plurality of patterns to obtain a detected angle;
- determining at least one of (1) the absolute angles of the at least two pattern types of the plurality of patterns, and (2) the relative angle of the at least two pattern types of the plurality of patterns; and
- analyzing the relative relationship of the plurality of patterns using the at least one of the absolute angles and the relative angle obtained by the step of determining; and
- obtaining the embedded data of the original image using the relative relationship of the plurality of patterns.

12. The method of claim 11, further comprising the step of:
- extracting a color component from the original image to generate a binary image, wherein the plurality of patterns is detected using the binary image.

13. A computer readable medium storing computer instructions which, when executed, cause a computer to perform an image processing operation comprising:
- obtaining data to be embedded into an original image, wherein the data is to be embedded in the form of a plurality of patterns;
- selecting, from a plurality of pattern types, at least two pattern types to be used for the plurality of patterns based on the data to be embedded;
- determining a relative relationship of the at least two pattern types of the plurality of patterns based on the data to be embedded, wherein the relative relationship is expressed by at least one of (1) absolute angles of the at least two pattern types of the plurality of patterns relative to the original image, and (2) a relative angle of the at least two pattern types of the plurality of patterns indicating the relationship of the absolute angles of the at least two pattern types of the plurality of patterns; and
- generating an embedded image by embedding the plurality of patterns, wherein the plurality of patterns has the relative relationship determined by the determining step and has the at least two pattern types selected by the selecting step.

14. A computer readable medium storing computer instructions which, when executed, cause a computer to perform an image processing operation comprising:

obtaining an original image, wherein the original image is presumed to be embedded with embedded data;

detecting a plurality of patterns having a relative relationship and at least two pattern types in the original image, wherein the relative relationship is expressed by at least one of (1) absolute angles of the at least two pattern types of the plurality of patterns relative to the original image, and (2) a relative angle of the at least two pattern types of the plurality of patterns indicating the relationship of the absolute angles of the at least two pattern types of the plurality of patterns;

detecting the at least two pattern types of the plurality of patterns based on characteristic information obtained from the plurality of patterns;

detecting an angle of each one of the at least two pattern types of the plurality of patterns to obtain a detected angle;

determining at least one of (1) the absolute angles of the at least two pattern types of the plurality of patterns, and (2) the relative angle of the at least two pattern types of the plurality of patterns; and analyzing the relative relationship of the plurality of patterns using the at least one of the absolute angles and the relative angle obtained by the step of determining; and obtaining the embedded data of the original image using the relative relationship of the plurality of patterns.

15. The apparatus of claim 7, wherein the unit angle for extracting is greater than a fluctuation range of the detected angle, wherein the fluctuation range has a value determined using a device including one of a printer and a scanner.

16. The apparatus of claim 7, wherein the means for determining comprises:

means for reducing the number of the plurality of ranges determined by the unit angle for extracting by combing two ranges that are adjacent with each other into one combined range, wherein the means for determining determines whether the detected angle belongs to the combined range to obtain the combined range to which the detected angle belongs, and determines the value of the at least one of the absolute angles and the relative angle based on the obtained combined range.

17. A system for embedding data to be embedded into an original image, the system comprising:

an embedded data obtainer to obtain the data to be embedded, wherein the data is to be embedded into an embedded area of the original image in the form of a plurality of patterns;

a pattern determinator to select, from a plurality of pattern types, at least two pattern types to be used for the plurality of patterns based on the data to be embedded, and to determine a relative relationship of the at least two pattern types of the plurality of patterns based on the data to be embedded, wherein the relative relationship is expressed by at least one of (1) absolute angles of the at least two pattern types of the plurality of patterns relative to the original image, and (2) a relative angle of the at least two pattern types of the plurality of patterns indicating the relationship of the absolute angles of the at least two pattern types of the plurality of patterns; and a pattern embedder to embed the plurality of patterns having the relative relationship determined by the pattern determinator and having the at least two pattern types selected by the pattern determinator to the embedded area of the original image.

\* \* \* \* \*

UNITED STATES PATENT AND TRADEMARK OFFICE
CERTIFICATE OF CORRECTION

PATENT NO. : 7,609,851 B2
APPLICATION NO. : 11/369964
DATED : October 27, 2009
INVENTOR(S) : Guan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 903 days.

Signed and Sealed this

Twelfth Day of October, 2010

David J. Kappos
*Director of the United States Patent and Trademark Office*